US010638559B2

(12) United States Patent
Smith

(10) Patent No.: US 10,638,559 B2
(45) Date of Patent: *Apr. 28, 2020

(54) SOLID STATE MICROWAVE HEATING APPARATUS AND METHOD WITH STACKED DIELECTRIC RESONATOR ANTENNA ARRAY

(71) Applicant: Freescale Semiconductor, Inc., Austin, TX (US)

(72) Inventor: James Smith, Mesa, AZ (US)

(73) Assignee: NXP USA, Inc., Austin, TX (US)

( * ) Notice: Subject to any disclaimer, the term of this patent is extended or adjusted under 35 U.S.C. 154(b) by 718 days.

This patent is subject to a terminal disclaimer.

(21) Appl. No.: 15/199,656

(22) Filed: Jun. 30, 2016

(65) Prior Publication Data
US 2018/0007745 A1    Jan. 4, 2018

(51) Int. Cl.
| H05B 6/72 | (2006.01) |
| H05B 6/68 | (2006.01) |
| H05B 6/66 | (2006.01) |
| H05B 6/70 | (2006.01) |

(52) U.S. Cl.
CPC .............. *H05B 6/72* (2013.01); *H05B 6/662* (2013.01); *H05B 6/686* (2013.01); *H05B 6/70* (2013.01); *Y02B 40/143* (2013.01)

(58) Field of Classification Search
CPC .......... H05B 6/72; H05B 6/662; H05B 6/686; H05B 6/70; H05B 6/68; Y02B 40/143
USPC ....... 219/748, 716, 746, 750, 756, 761, 678, 219/690, 697, 725
See application file for complete search history.

(56) References Cited

U.S. PATENT DOCUMENTS

| 4,121,078 | A | | 10/1978 | Takano et al. |
| 5,453,754 | A | | 9/1995 | Fray |
| 5,517,203 | A | * | 5/1996 | Fiedziuszko .......... H01P 1/2086 333/202 |
| 6,093,921 | A | | 7/2000 | Gaisford et al. |

(Continued)

FOREIGN PATENT DOCUMENTS

| DE | 4240104 A1 | 6/1994 |
| EP | 1232538 B1 | 11/2008 |

(Continued)

OTHER PUBLICATIONS

Arlon Microwave Materials, AR1000 PTFE/Woven Fiberglass Ceramic Filled High Er Laminates, 4 pgs. (Feb. 2005).

(Continued)

*Primary Examiner* — Tu B Hoang
*Assistant Examiner* — Masahiko Muranami
(74) *Attorney, Agent, or Firm* — Sherry W. Schumm

(57) ABSTRACT

A microwave heating apparatus includes a solid state microwave energy source, a first dielectric resonator antenna that includes a first exciter dielectric resonator and a first feed structure in proximity to the first exciter dielectric resonator, one or more additional dielectric resonators stacked above the top surface of the first exciter dielectric resonator to form a vertically-stacked dielectric resonator antenna array. The first feed structure is electrically coupled to the microwave energy source to receive a first excitation signal, and the first exciter dielectric resonator is configured to produce a first electric field in response to the excitation signal provided to the first feed structure.

33 Claims, 15 Drawing Sheets

(56) References Cited

U.S. PATENT DOCUMENTS

| | | | |
|---|---|---|---|
| 6,150,907 A * | 11/2000 | Loi | H01P 1/207 333/212 |
| 6,452,565 B1 | 9/2002 | Kingsley et al. | |
| 2003/0106891 A1 | 6/2003 | Fagrell et al. | |
| 2004/0051602 A1 * | 3/2004 | Pance | H01P 1/162 333/202 |
| 2005/0162316 A1 | 7/2005 | Thomas et al. | |
| 2005/0225499 A1 * | 10/2005 | Kingsley | H01Q 9/0485 343/911 R |
| 2006/0081624 A1 * | 4/2006 | Takada | H01J 37/32192 219/716 |
| 2006/0244668 A1 * | 11/2006 | Iellici | H01Q 9/0485 343/729 |
| 2007/0115080 A1 * | 5/2007 | Pance | H01P 1/2084 333/202 |
| 2008/0042903 A1 * | 2/2008 | Cheng | H01Q 9/0485 343/700 MS |
| 2008/0111550 A1 * | 5/2008 | Freytag | G01R 33/34007 324/322 |
| 2011/0234010 A1 | 9/2011 | Bohori et al. | |
| 2013/0063158 A1 * | 3/2013 | Potrepka | G01R 27/2658 324/636 |
| 2013/0175262 A1 | 7/2013 | Gharpurey et al. | |
| 2013/0278345 A1 * | 10/2013 | Shi | H01R 24/542 331/74 |

FOREIGN PATENT DOCUMENTS

| | | |
|---|---|---|
| FR | 2 310 058 A1 | 11/1976 |
| GB | 2 355 855 A | 5/2001 |
| GB | 2 391 154 A | 1/2004 |
| JP | 57-130395 A | 8/1982 |
| WO | 03/03479 A2 | 4/2003 |
| WO | 2004010740 A1 | 1/2004 |

OTHER PUBLICATIONS

Liang, E.C. "An Overview of High Q TE Mode Dielectric Resonators and Applications", Microwave Journal, 4 pgs. (Feb. 2015).

Kingsley, S.P. et al. "Beam steering and monopulse processing of probe-fed dielectric resonator antennas", IEE Proceedings—Radar, Sonar and Navigation, vol. 146, No. 3, pp. 121-125 (Jun. 1999).

Non Final Office Action; U.S. Appl. No. 15/199,709; 23 pages (dated May 23, 2019).

Keyrouz, S. et al; "Dielectric Resonator Antennas: Basic Concepts, Design Guidelines, and Recent Developments at Millimeter-Wave Frequencies"; International J. of Antennas and Propagation, vol. 2016, Article 6075680; Hindawi Publishing Corp; 20 pages (Sep. 22, 2016).

Notice of Allowance; U.S. Appl. No. 15/199,709; 8 pages dated Oct. 25, 2019.

* cited by examiner

SOLID STATE MICROWAVE HEATING APPARATUS AND METHOD WITH STACKED DIELECTRIC RESONATOR ANTENNA ARRAY

TECHNICAL FIELD

Embodiments of the subject matter described herein relate generally to solid state microwave heating apparatus and methods of their operation and manufacture.

BACKGROUND

For many years, magnetrons have been commonly used in microwave ovens to generate microwave energy for the purpose of heating food, beverages, or other items. A magnetron essentially consists of a circular chamber with multiple cylindrical cavities spaced around its rim, a cathode built into the center of the chamber, and a magnet configured to generate a magnetic field. When incorporated into a microwave system, the cathode is coupled to a direct current (DC) power supply that is configured to provide a high voltage potential to the cathode. The magnetic field and the cylindrical cavities cause electrons within the chamber to induce a resonant, high-frequency radio frequency (RF) field in the chamber, and a portion of the field may be extracted from the chamber via a probe. A waveguide coupled to the probe directs the RF energy to a load. For example, in a microwave oven, the load may be a heating chamber, the impedance of which may be affected by objects within the heating chamber.

Although magnetrons have functioned well in microwave and other applications, they are not without their disadvantages. For example, magnetrons typically require very high voltages to operate. In addition, magnetrons may be susceptible to output power degradation over extended periods of operation. Thus, the performance of systems in which magnetrons are included may degrade over time. Further, magnetrons tend to be bulky, heavy components that are sensitive to vibration, thus making them unsuitable for use in portable applications.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
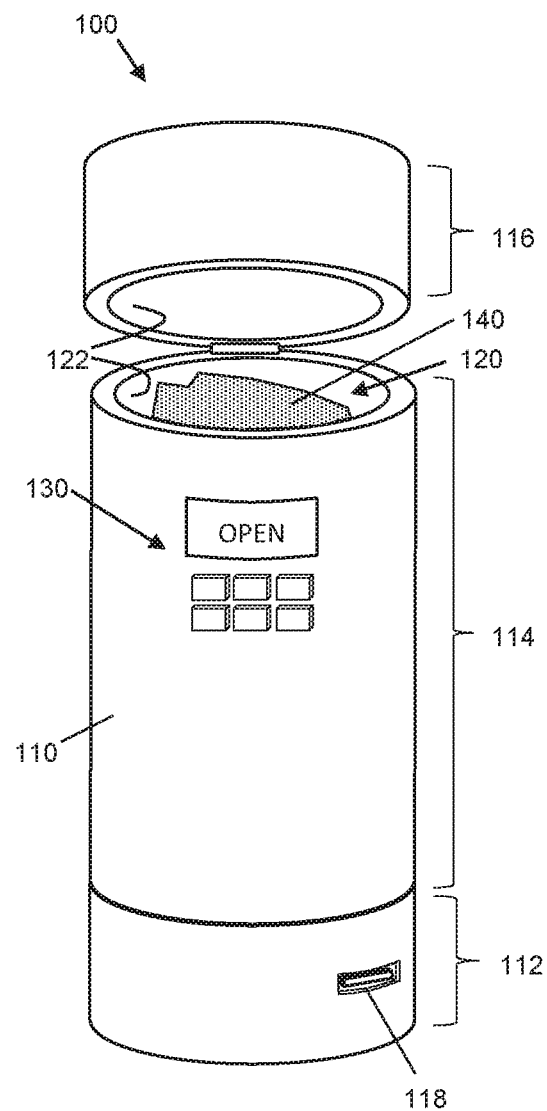
FIGS. 1 and 2 are perspective views of a portable microwave heating apparatus in open and closed states, respectively, in accordance with an example embodiment.

The following detailed description is merely illustrative in nature and is not intended to limit the embodiments of the subject matter or the application and uses of such embodiments. As used herein, the words "exemplary" and "example" mean "serving as an example, instance, or illustration." Any implementation described herein as exemplary or an example is not necessarily to be construed as preferred or advantageous over other implementations. Furthermore, there is no intention to be bound by any expressed or implied theory presented in the preceding technical field, background, or the following detailed description.

Embodiments of the subject matter described herein relate to solid-state microwave heating apparatus (e.g., stationary or portable microwave ovens, microwave defrosters, and so on), although the various embodiments may be utilized in other systems, as well. As described in greater detail below, exemplary microwave heating apparatus are realized using a microwave generation module, a dielectric resonator antenna (DRA) array, and a chamber. The microwave generation module provides RF energy to the DRA array, and the DRA array radiates energy into the chamber within which a load (e.g., a food load or some other type of load) may be positioned.

As used herein, the term "dielectric resonator" means an article consisting of a bulk dielectric material (e.g., ceramic), which is capable of receiving RF energy, and resonating the RF energy at a resonant frequency of the dielectric resonator in one or more resonant modes. The resonant frequency is determined by the shape and dimensions of the dielectric material, and the dielectric constant of the bulk dielectric material. In general, a dielectric resonator is characterized as having a relatively high dielectric constant and a relatively high Q factor. According to various embodiments, several types of resonant modes can be excited in a dielectric resonator.

As used herein, the term "dielectric resonator antenna" or "DRA" means an antenna assembly that includes a dielectric resonator and one or more RF signal feeds. The RF signal feed is configured to carry an RF signal, and is positioned with respect to the dielectric resonator so that the RF signal excites the dielectric resonator, and causes the dielectric resonator to resonate RF energy at the resonant frequency of the dielectric resonator in a resonant mode. The resonant characteristics of a DRA depend on the shape and size of the dielectric resonator and on the shape, size, and position of the feed(s). As used herein, a dielectric resonator that is directly excited by an RF signal from a feed is referred to as an "exciter dielectric resonator." Desirably, the RF signal is an oscillating signal having a frequency that is at or near the resonant frequency of the exciter dielectric resonator.

According to several embodiments, a DRA includes a dielectric resonator with one or more metallic monopole probes (i.e., feeds) inserted into the dielectric material. A ground plane may be present on one side of the DRA so that the DRA radiates power predominantly in a "forward" direction (e.g., into a heating chamber that is adjacent to the DRA). In alternate embodiments, a DRA includes a dielectric resonator disposed on or close to a grounded substrate, with energy being transferred to the dielectric resonator by way of monopole aperture feeds provided in the grounded substrate. Direct connection to and excitation by a microstrip transmission line is also possible.

The terms "dielectric resonator antenna array" and "DRA array," as used herein, mean an assembly that includes at least one DRA and at least one additional dielectric resonator that is closely coupled (e.g., capacitively coupled) to the DRA. The dielectric resonator of the DRA and the additional dielectric resonator(s) are arranged in a stacked configuration, in an embodiment. Some dielectric resonator(s) also may be arranged in a co-planar configuration, in a further embodiment. Either way, a DRA array includes multiple stacked dielectric resonators and one or more feeds in or in proximity to one or more of the multiple dielectric resonators to form one or more DRAs in the array.

According to an embodiment, the dielectric resonator of a DRA is referred to as an "exciter resonator," in that it is configured to be directly excited and caused to resonate by a signal carried on a feed (i.e., it receives electromagnetic energy directly from a feed). In contrast, one or more of the dielectric resonators in the DRA array may be a "parasitic resonator," in that it does not receive electromagnetic energy directly from a feed. In an embodiment, the one or more exciter resonator(s) of the DRA(s) and the one or more parasitic resonators are arranged so that capacitive coupling occurs between the dielectric resonators of the DRA, or more specifically the exciter resonator of the DRA, and the parasitic resonator(s). In other words, the parasitic resonator (s) may be arranged so that the electric fields produced by the exciter resonator(s) (referred to as "exciter-produced electric fields") directly impinge on the one or more parasitic resonators, causing the parasitic resonator(s) also to resonate. Alternatively, the exciter-produced electric fields may be reflected by a chamber within which the DRA array is positioned, and the reflected energy may impinge on the parasitic resonator(s), causing the parasitic resonator(s) to re-radiate the energy into the chamber. Said another way, as a result of the exciter-produced electric field(s) directly or indirectly impinging on a parasitic resonator, the parasitic resonator, in turn, produces a "parasitic-produced electric field." The dielectric resonators in the DRA array are arranged so that the exciter-produced and parasitic-produced electric fields each are primarily directed in substantially the same direction(s). In an embodiment of a microwave heating apparatus, the exciter-produced and parasitic-produced electric fields each are primarily directed in the direction of a heating chamber of a microwave heating apparatus, where the chamber is configured to contain a load (e.g., a food load) to be heated. As used herein, the term "heat" and its various derivatives refers to increasing the thermal energy of a mass. Although such an increase in the thermal energy (or "heating") may raise the temperature of the mass to a temperature that is significantly above an ambient temperature, "heating" also may involve raising the temperature of the mass by any amount (e.g., defrosting the mass to raise the temperature from below freezing to an ambient temperature).

As will be discussed in more detail below, the embodiments of DRA arrays disclosed herein constitute relatively wideband structures, which efficiently couple RF energy from the microwave generation module into a load within the heating chamber. Because of the wide bandwidth, the embodiments of the DRA arrays are much less sensitive to near field loading (e.g., due to loads placed within the chamber), when compared with conventional antennas used in microwave heating applications.

Figure 2:
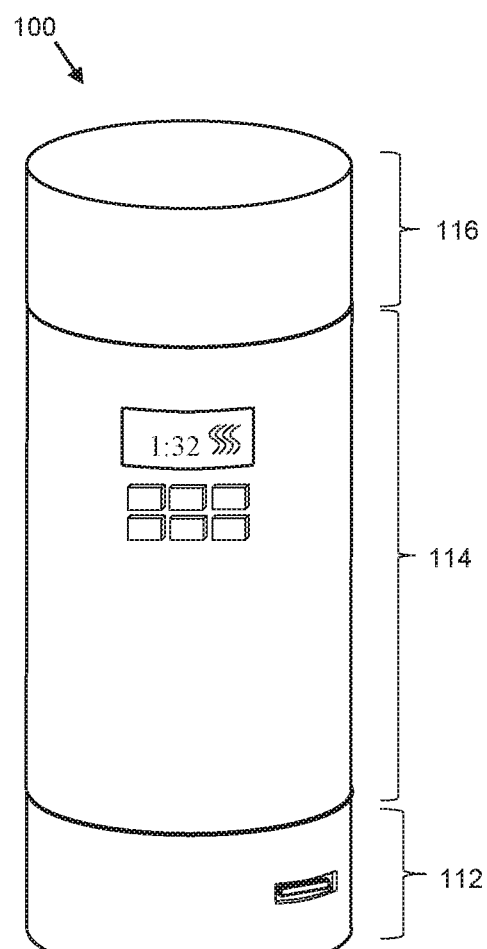

FIGS. 1 and 2 are perspective views of a portable microwave heating apparatus 100 in open and closed states, respectively, in accordance with an example embodiment. Microwave heating apparatus 100 includes a housing 110, a heating chamber 120, a control panel 130, one or more microwave power generation modules (e.g., module 350, FIG. 3), one or more DRA arrays (e.g., DRA array 500, FIGS. 5, 6), and other components that are discussed in more detail below.

The housing 110 includes a base portion 112, a chamber portion 114, and a lid 116, in an embodiment. The base portion 112 may contain the microwave power generation module(s) and at least a portion of one or more DRA arrays, in an embodiment. In addition, the base portion 112 may contain a power supply system, such as a rechargeable or non-rechargeable battery system for powering the microwave power generation module(s) and the control panel 130. An external connection port 118, when coupled to a corresponding cable (not shown), may be used to receive power to operate the apparatus 100, and/or to recharge a rechargeable battery system of the apparatus 100. In addition, the external connection port 118 may be used to communicate with an external system to receive software updates, for example.

Figure 9:
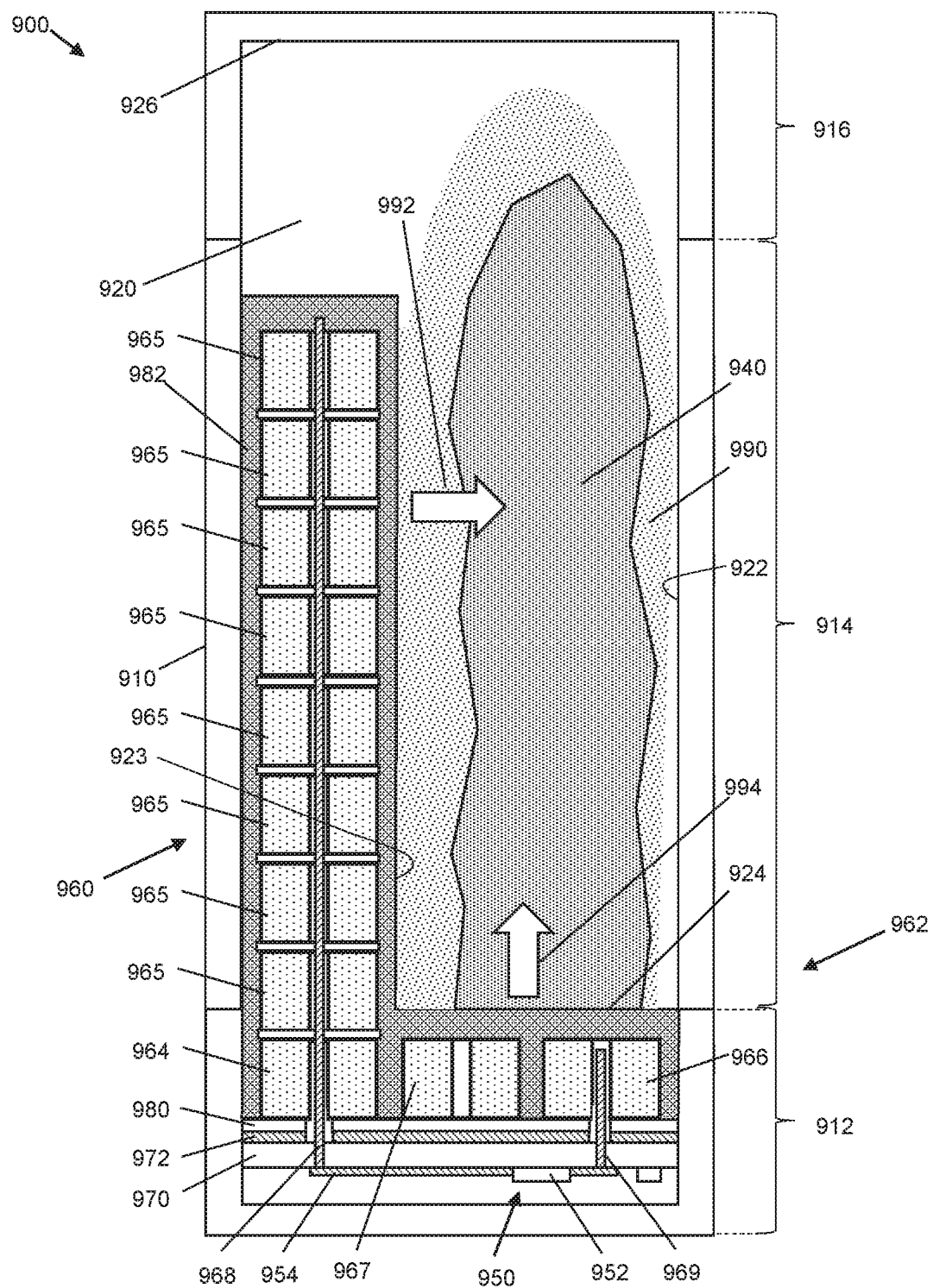
FIG. 9 is a cross-sectional, side view of the portable microwave heating apparatus of FIGS. 1 and 2, in accordance with an example embodiment.

The heating chamber 120 is located within the chamber portion 114 of the housing 110, and is defined by interior side walls 122, a chamber bottom surface (e.g., surface 924, FIG. 9), and a chamber top surface (e.g., surface 926, FIG. 9). When lid 116 is open, as shown in FIG. 1, the heating chamber 120 is accessible, and a load 140 (e.g., a food load or other load) may be placed within the chamber 120. When lid 116 is closed, as shown in FIG. 2, the heating chamber 120 becomes an enclosed air cavity, which essentially functions as a waveguide with a blocked end. According to an embodiment, the microwave generation module(s) are deactivated when the lid 116 is open, and may only be activated when the lid 116 is closed. Accordingly, the microwave heating apparatus 100 may include a sensor or other mechanism for detecting the state (i.e., open or closed) of the lid 116.

To operate the microwave heating apparatus 100, a user may open the lid 116, place one or more objects (e.g., load 140) into the heating chamber 120, close the lid 116, and provide inputs via the control panel 130 that specify a desired heating duration and a desired power level. In response, a system controller (e.g., controller 310, FIG. 3) causes the microwave power generation module(s) (e.g., module 350, FIG. 3) to provide an excitation signal to the DRA array(s) (e.g., DRA array 360, FIG. 3). The DRA array, in response, radiates electromagnetic energy in the microwave spectrum (referred to herein as "microwave energy") into the heating chamber 120. More specifically, the system controller causes the microwave power generation module(s) to cause the DRA array(s) to radiate microwave energy into the heating chamber 120 for a period of time and at a power level that is consistent with the user inputs. The microwave energy increases the thermal energy of the load 140 (i.e., the microwave energy causes the load to heat up).

Each DRA array is configured to radiate microwave energy into the heating chamber 120. The radiated energy has a wavelength in the microwave spectrum that is particularly suitable for heating liquid and solid objects (e.g., liquids and food), in an embodiment. For example, each DRA array may be configured to radiate microwave energy having a frequency in a range of about 2.0 gigahertz (GHz) to about 3.0 GHz into the heating chamber 120. More specifically, each DRA array may be configured to radiate microwave energy having a wavelength of about 2.45 GHz into the heating chamber 120, in an embodiment.

As will be described in further detail below, each microwave power generation module may be implemented as an integrated "solid state" module, in that each microwave power generation module includes a solid state circuit configuration to generate and radiate microwave energy rather than including a magnetron. Accordingly, embodiments of systems in which embodiments of microwave power generation modules are included may operate at relatively lower voltages, may be less susceptible to output power degradation over time, and/or may be relatively compact, when compared with conventional magnetron-based microwave systems.

Although microwave heating apparatus 100 is shown with its components in a particular relative orientation with respect to one another, it should be understood that the various components may be oriented differently, as well. In addition, the physical configurations of the various components may be different. For example, control panel 130 may have more, fewer, or different user interface elements, and/or the user interface elements may be differently arranged. Alternatively, control panel 130 may be located within the base portion 112 or the lid portion 116 of the apparatus 100. In addition, although a substantially cylindrical apparatus 100 and heating chamber 120 is illustrated in FIG. 1, it should be understood that a heating chamber may have a different shape, in other embodiments (e.g., rectangular, ellipse, and so on). Further, microwave heating apparatus 100 may include additional components that are not specifically depicted in FIG. 1. Further still, although embodiments of "portable" microwave heating apparatus are illustrated and described herein in detail, those of skill in the art would understand that the inventive embodiments of DRA arrays also could be applied to stationary microwave heating apparatus (e.g., larger apparatus and/or apparatus that are powered by an external electricity supply network (or grid)).

Figure 3:
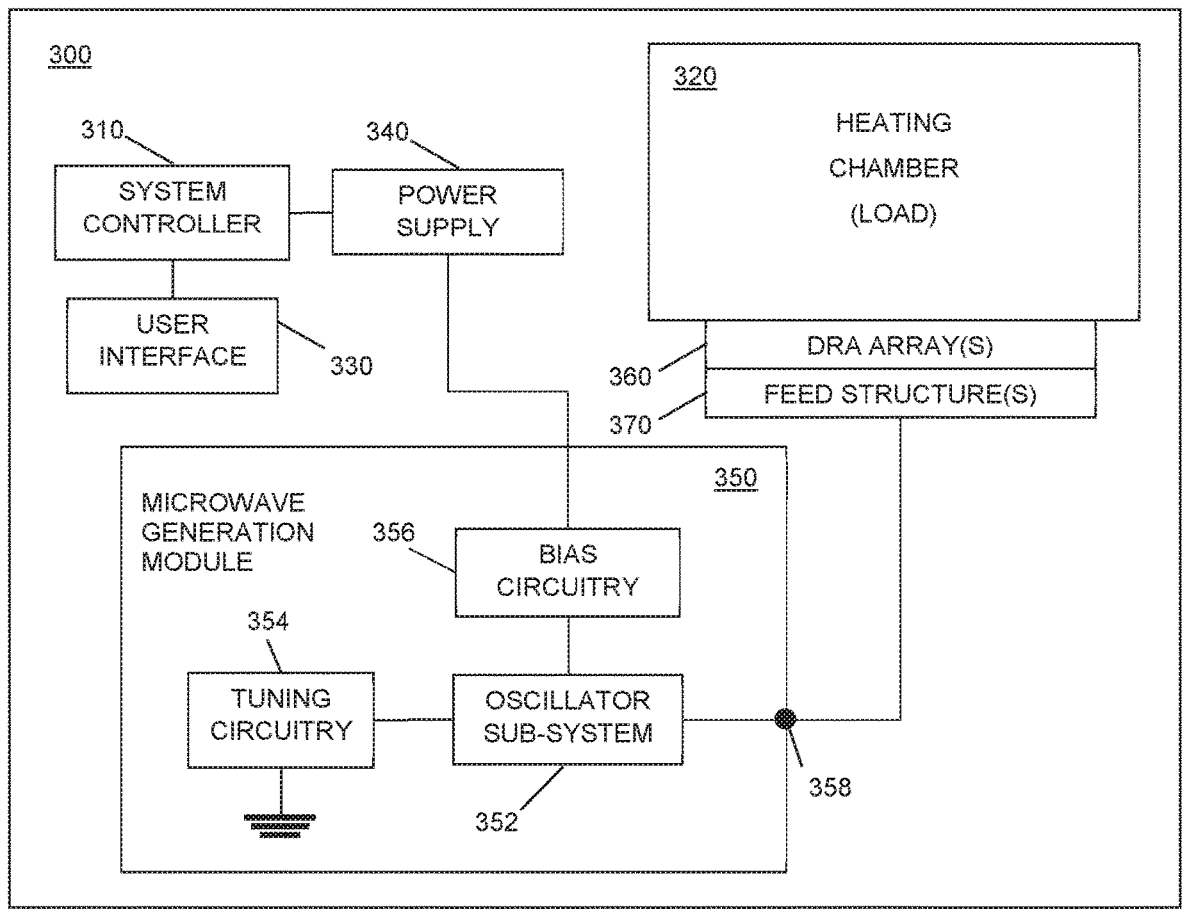
FIG. 3 is a simplified block diagram of a microwave heating apparatus that includes a microwave power generation module and a dielectric resonator antenna (DRA) array, in accordance with an example embodiment.

FIG. 3 is a simplified block diagram of a microwave heating apparatus 300 (e.g., microwave heating apparatus 100, FIG. 1) that includes one or more DRA arrays 360, in accordance with an example embodiment. In addition, microwave system 300 includes a system controller 310, user interface 330, power supply 340, heating chamber 320, and one or more microwave power generation modules 350. It should be understood that FIG. 3 is a simplified representation of a microwave system 300 for purposes of explanation and ease of description, and that practical embodiments may include other devices and components to provide additional functions and features, and/or the microwave system 300 may be part of a larger electrical system.

User interface 330 may correspond to a control panel (e.g., control panel 130, FIG. 1), for example, which enables a user to provide inputs to the system regarding parameters for a heating operation (e.g., the duration of a heating operation, the power level for a heating operation, codes that correlate with particular heating operation parameters, and so on), start and cancel buttons, and so on. In addition, the user interface may be configured to provide user-perceptible outputs indicating the status of a heating operation (e.g., a countdown timer, audible tones indicating completion of the heating operation, and so on) and other information.

System controller 310 is coupled to user interface 330 and to power supply system 340. For example, system controller 310 may include one or more general purpose or special purpose processors (e.g., a microprocessor, microcontroller, Application Specific Integrated Circuit (ASIC), and so on), volatile and/or non-volatile memory (e.g., Random Access Memory (RAM), Read Only Memory (ROM), flash, various registers, and so on), one or more communication busses, and other components. According to an embodiment, system controller 310 is configured to receive signals indicating user inputs received via user interface 330, and to cause power supply 340 to provide power to the microwave power generation module(s) 350 for time durations and at power levels that correspond to the received user inputs.

Power supply 340 may selectively provide a supply voltage to each microwave power generation module 350 in accordance with control signals received from system controller 310. When supplied with an appropriate supply voltage from power supply 340, each microwave power generation module 350 will produce an RF signal, which is conveyed to one or more feed structures 370 (or "feeds") that form portions of the DRA array(s) 360. The DRA array(s) 360, in response, radiate microwave energy into heating chamber 320. As mentioned previously, heating chamber 320 essentially functions as a waveguide with a closed end. The dielectric resonators of the DRA array(s) 360, the heating chamber 320, and any loads (e.g., load 140, FIG. 1) positioned in the heating chamber 320 correspond to a cumulative load for the microwave energy produced by the DRA array(s) 360. More specifically, the dielectric resonators, the heating chamber 320, and the load within the heating chamber 340 present an impedance to the microwave power generation module(s) 350.

According to an embodiment, each microwave power generation module 350 may include a solid-state oscillator sub-system 352, frequency tuning circuitry 354, and bias circuitry 356. According to an embodiment, the oscillator sub-system 352 includes a solid-state amplifier (e.g., including one or more power transistors) and resonant circuitry. In various embodiments, the power amplifier within the oscillator sub-system 352 may include a single ended amplifier, a double ended amplifier, a push-pull amplifier, a Doherty amplifier, a Switch Mode Power Amplifier (SMPA), or another type of amplifier.

In an embodiment, oscillator sub-system 352 is a power microwave oscillator, in that the elements of the oscillator sub-system 352 are configured to produce an oscillating electrical signal, at output node 358, where the signal has a frequency in the microwave spectrum with a relatively high output power (e.g., an output power in a range of about 100 Watts (W) to about 300 W or more). The resonant circuitry, which is coupled along a feedback path between the output and input of the power amplifier, completes a resonant feedback loop that causes the amplified electrical signals produced by the power amplifier to oscillate at or near the resonant frequency of the resonant circuitry. In an embodiment, the resonant circuitry is configured to resonate at frequency in the microwave spectrum (e.g., at a frequency of about 2.45 GHz). The amplified electrical signals produced by the amplifier arrangement oscillate at about the frequency of resonance of the resonant circuit. It should be noted that, in practice, embodiments of the resonant circuitry may be configured to resonate at different frequencies to suit the needs of the particular application utilizing the microwave system 300.

According to an embodiment, the power amplifier is implemented as a single- or multi-stage transistor having an input terminal (or control terminal) coupled to the tuning circuitry 354 and an output terminal (e.g., a drain terminal) coupled to the amplifier output node 358. For example, the transistor may include a field effect transistor (FET) having a gate terminal connected to the tuning circuitry 354, a drain terminal connected to the amplifier output node 358, and a source terminal connected to a ground reference voltage (e.g., about 0 Volts, although the ground reference voltage may be higher or lower than 0 Volts, in some embodiments). For example, the transistor may include a laterally diffused metal oxide semiconductor FET (LDMOSFET) transistor. However, it should be noted that the transistor is not intended to be limited to any particular semiconductor technology, and in other embodiments, the transistor may be realized as a gallium nitride (GaN) transistor, another type of MOSFET transistor, a bipolar junction transistor (BJT), or a transistor utilizing another semiconductor technology.

Frequency tuning circuitry 354 includes capacitive elements, inductive elements, and/or resistive elements that are configured to adjust the oscillating frequency of the oscillating electrical signals generated by the oscillator sub-system 352. In an exemplary embodiment, the frequency tuning circuitry 354 is coupled between a ground reference voltage and the input of the oscillator sub-system 352.

Bias circuitry 356 is coupled between the power supply 340 and the oscillator sub-system 352, and is configured to receive a positive (or supply) voltage from power supply 340. According to an embodiment, bias circuitry 356 is configured to control the direct current (DC) or nominal bias voltages at the gate and/or drain terminals of the transistor(s) within the oscillator sub-system 352, in order to turn the transistor(s) on and to maintain the transistor(s) operating in the active mode during operation of the oscillator sub-system 352. Although not illustrated, bias circuitry 356 also may include a temperature sensor and temperature compensation circuitry configured to sense or otherwise detect the temperature of the transistor(s) and to adjust the gate bias voltage in response to increases and/or decreases in the temperature of the transistor(s). In such an embodiment, bias circuitry 356 may be configured to maintain substantially constant quiescent current for the transistor(s) in response to temperature variations.

Through one or more impedance matching circuits (not shown), the oscillator sub-system 352 is coupled to feed structure(s) 370. As will be explained in more detail below, embodiments of feed structures 370 include conductive structures that are positioned within one or more dielectric resonators of one or more DRA arrays 360. Alternatively, the feed structures 370 may include microstrip lines that are aperture coupled to one or more dielectric resonators of one or more DRA arrays 360.

The DRA array(s) 360 are configured to radiate microwave energy into the heating chamber 320. More specifically, the feed structure(s) 370 and DRA array(s) 360 translate the oscillating electrical signals at the oscillator output node 358 into electromagnetic microwave signals. For example, in a microwave heating apparatus application where the oscillator sub-system 352 is configured to produce signals at a frequency of about 2.45 GHz, the DRA array(s) 360 translate the oscillating electrical signals at the oscillator output node 358 into microwave electromagnetic signals at 2.45 GHz, and direct the microwave signals into the heating chamber 320 of the microwave heating apparatus 300.

When the microwave heating apparatus 300 includes multiple DRA arrays 360, the DRA arrays 360 may be configured to resonate at the same frequency and power level, and may be operated simultaneously or in a defined sequence. Alternatively, the DRA arrays 360 may be configured differently (e.g., they may resonate at different frequencies, and or may radiate microwave energy at different power levels). In such alternate embodiments, the DRA arrays 360 may be operated simultaneously or in a defined sequence.

As will be depicted in more detail in FIGS. 5-7, 9-14, and 21-25, each DRA array includes a plurality of dielectric resonators that are arranged in a stacked configuration so that at least one parasitic resonator is closely coupled (e.g., closely capacitively coupled) with at least one exciter resonator. Before discussing various embodiments of DRA arrays in detail, an embodiment of a fundamental building block of a DRA array, or more specifically an embodiment of a dielectric resonator, will be discussed in conjunction with FIG. 4.

Figure 4:
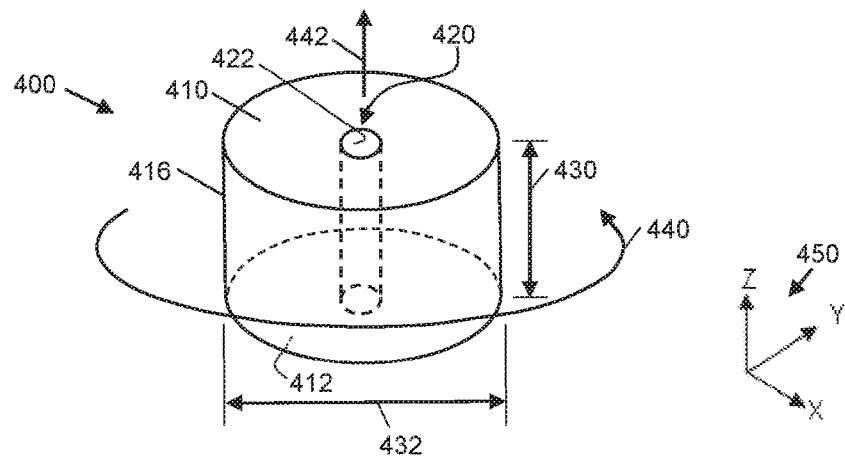
FIG. 4 is a perspective view of a dielectric resonator.

FIG. 4 is a perspective view of a dielectric resonator 400, which is suitable for use in an embodiment of a DRA array. Dielectric resonator 400 is formed from a bulk dielectric material, such as ceramic, a perovskite compound (e.g., incorporating $Nd_2O_3$, $TiO_2$, CaO/SrO, BaO, MgO, ZnO, CoO, $Ta_2O_5$, and/or $Nb_2O_5$, and so on), or other suitable materials. According to an embodiment, the bulk dielectric material has a relatively high dielectric constant, such as a dielectric constant between about 8 and about 70, although the dielectric constant could be larger or smaller, as well. Further, the bulk dielectric material has a relatively high quality factor (Q), in an embodiment, such as an unloaded Q between about 40,000 and about 300,000, although the bulk dielectric material may have a lower or higher unloaded Q, as well. Further still, the bulk dielectric material has an extremely low coefficient of thermal expansion (e.g., about zero ppm), in an embodiment.

In the illustrated embodiment, the dielectric resonator 400 has a cylindrical shape with a top surface 410, a bottom surface 412, and external sidewalls 416 extending between the top and bottom surfaces 410, 412. In addition, the dielectric resonator 400 has a central channel or hole 420 extending between the top and bottom surfaces 410, 412 along a central axis, where the central hole 420 is defined by internal sidewalls 422. As will be discussed in more detail later in conjunction with FIGS. 15-20, dielectric resonators having a variety of other shapes may be used in various other embodiments of a DRA array, including dielectric resonators that do not include a central channel.

The illustrated dielectric resonator 400 may be utilized as an exciter resonator or as a parasitic resonator in a DRA array. When utilized as an exciter resonator, a conductive feed (e.g., feed 550, 551, FIG. 5) may be inserted into the central hole 420 from the bottom surface 412 of the dielectric resonator 400, and an RF signal provided to the feed may be used to cause the dielectric resonator 400 to resonate at a characteristic resonant frequency of the dielectric resonator 400. For example, the resonant frequency may be in a range of about 2.0 GHz to about 3.0 GHz, although the resonant frequency may be lower or higher, as well. The resonant frequency of the dielectric resonator 400 is defined, at least in part, by the dielectric constant of the bulk dielectric material, and by the shape and size (e.g., height 430 and diameter 432) of the dielectric resonator 400. In general, the higher the dielectric constant, the smaller a dielectric resonator may be for a given resonant frequency. In addition, for any given dielectric constant and dielectric resonator shape, a smaller dielectric resonator resonates at a higher resonant frequency that a larger dielectric resonator.

When a feed positioned in the dielectric resonator 400 carries a suitable RF signal, a vertical e-field 442 (i.e., an e-field 442 that is orthogonal to the top and/or bottom surfaces 410, 412) is generated. As used herein, the vertical e-field 442 is referred to as a "primary" electric field. The strength of the vertical or primary e-field 442 may depend, at least in part, on how far the feed extends into the central hole 420. In addition, when an appropriate RF signal is used to excite the dielectric resonator 400, a circumferential e-field 440 (referred to herein as a "secondary" electric field) also is produced by the dielectric resonator 400. More specifically, when appropriately excited by an RF signal carried by the feed, the dielectric resonator 400 may produce electromagnetic energy fields directed in three polarizations with respect to orthogonal axes of an inertial coordinate system (e.g., orthogonal axes "X," "Y," and "Z" of a fixed, inertial coordinate system 450).

As mentioned above, a DRA array that may be suitable for use in a microwave heating apparatus (e.g., microwave heating apparatus 100, 200, FIGS. 1, 2) may include a plurality of dielectric resonators (e.g., multiple instances of dielectric resonator 400, FIG. 4) that are arranged so that at least one parasitic resonator is closely coupled with at least one exciter resonator. Alternatively, each of the dielectric resonators in the DRA array may be directly excited by a feed, making all of the dielectric resonators classifiable as exciter resonators.

Figure 5:
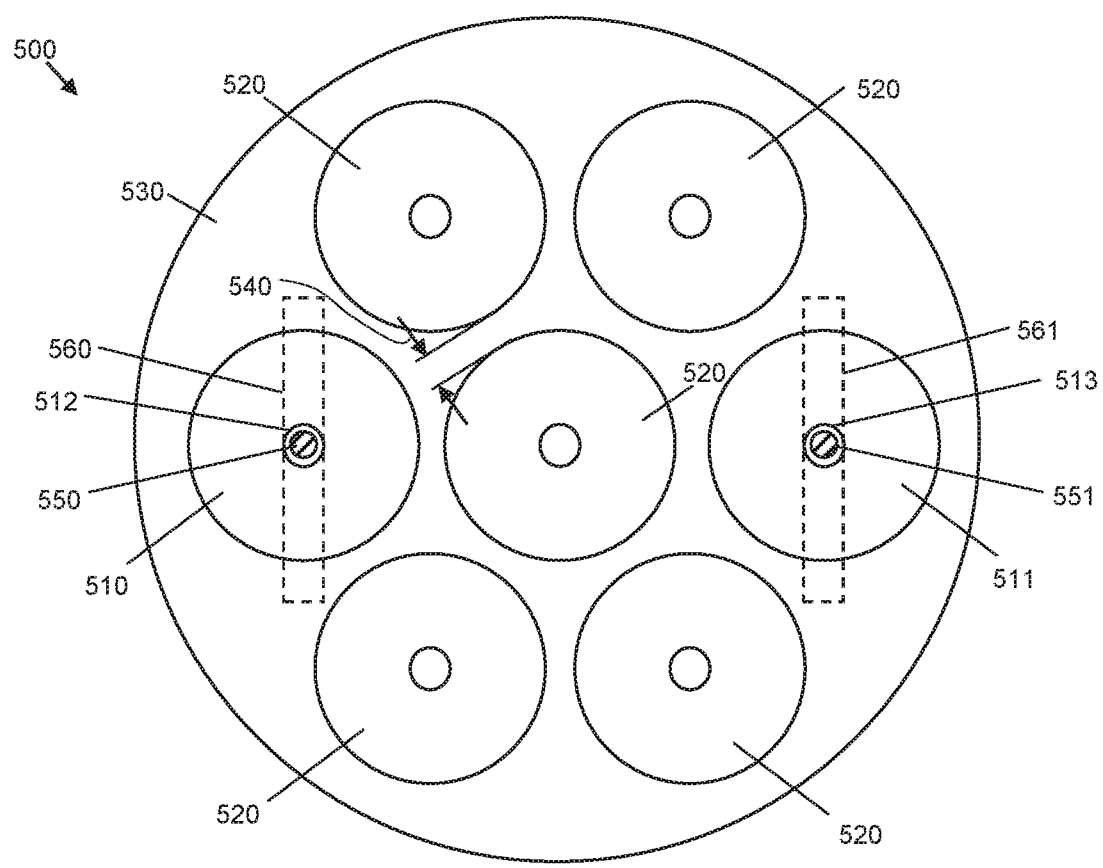
FIGS. 5 and 6 are top and perspective views of the DRA array, in accordance with an example embodiment.
Figure 6:
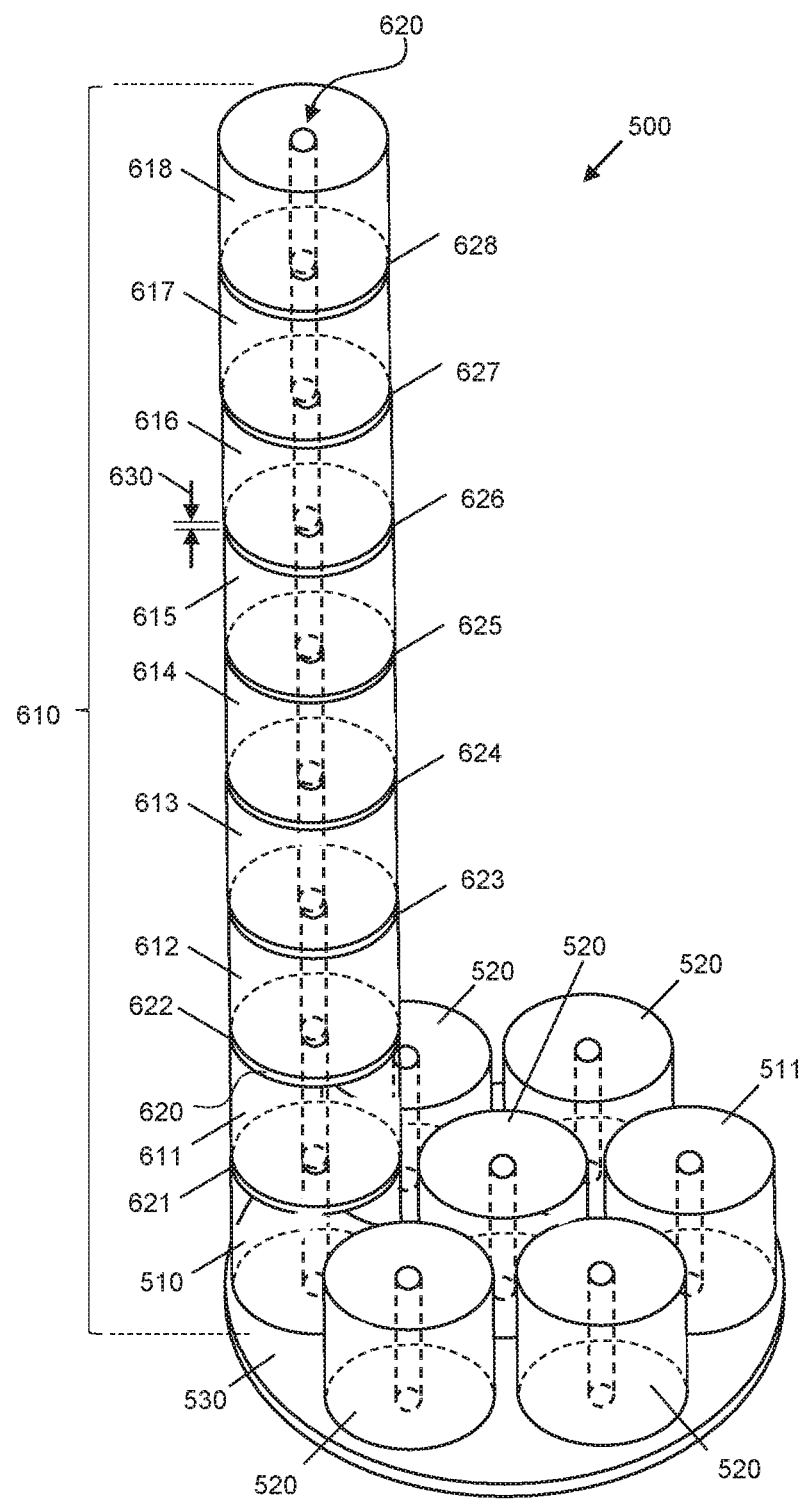

For example, FIGS. 5 and 6 are top and perspective views of a compound DRA array 500, in accordance with an example embodiment. The illustrated compound DRA array 500 includes a first, horizontally-arranged DRA array with seven horizontally-arranged adjacent dielectric resonators 510, 511, 520 coupled to a substrate 530, and a second, vertically-stacked DRA array with eight additional dielectric resonators 611-618 that are vertically stacked on an exciter dielectric resonator 510.

In an embodiment, one or more feeds 550, 551 configured to carry one or more RF signals are positioned within the central hole(s) 512, 513 of one or more of the dielectric resonators 510, 511, thus classifying those dielectric resonators 510, 511 as exciter resonators. In the embodiment of FIG. 5, dielectric resonators 510, 511 and their associated feeds 550, 551 form two dielectric resonator antennas (DRAs).

When appropriate RF signals are carried by the feeds 550, 551, the signals will cause the exciter resonators 510, 511 to resonate at their resonant frequencies. This, in turn, will cause the exciter resonators 510, 511 to produce secondary e-fields around the circumference of each exciter resonator 510, 511 (e.g., e-field 440, FIG. 4). In addition, each of the exciter resonators 510, 511 will produce a primary e-field extending orthogonally upward from the top surface of each exciter resonator 510, 511 (e.g., e-field 442, FIG. 4).

In an embodiment, the vertically-stacked dielectric resonators 510, 611-618 are physically coupled to each other to form a dielectric resonator stack 610. Because at least the lowest dielectric resonator 510 functions as a DRA, and the stack 610 includes multiple dielectric resonators, the assembly including the feed 550 and the dielectric resonators 510, 611-618 may be classified as a DRA array. In this DRA array, the dielectric resonators 510, 611-618 are stacked in a concentric manner (e.g., aligned so that their central axes or channels 620 are linearly aligned). In an embodiment in which each of the dielectric resonators 510, 611-618 in the stack 610 includes a central channel 620, the alignment results in a continuous channel extending from the bottom surface of the lowest resonator 510 to the top surface of the highest resonator 618. Accordingly, as will be discussed in more detail later, the feed 550 may extend into the stack 610 to any height (e.g., through any number of the resonators, starting from the lowest resonator 510 up to and potentially through the highest resonator 618). Alternatively, some of the dielectric resonators 510, 611-618 in the stack 610 may not include a central channel. In any event, any dielectric resonator 510, 611-618 into or through which the feed 550 extends may be considered an exciter resonator, and any dielectric resonator 611-618 into which the feed 550 does not extend may be considered a parasitic resonator.

The stack 610 includes multiple sets of adjacent resonators, where the top surface of a first (lower) dielectric resonator in a set of adjacent resonators is oriented toward the bottom surface of a second (higher) dielectric resonator in the set. Various embodiments of dielectric resonator stacks may include one or more sets of adjacent resonators. In the embodiment of FIG. 6, the stack 610 includes eight sets of adjacent resonators (i.e., a first set including resonators 510, 611, a second set including resonators 611, 612, a third set including resonators 612, 613, and so on).

Figure 11:
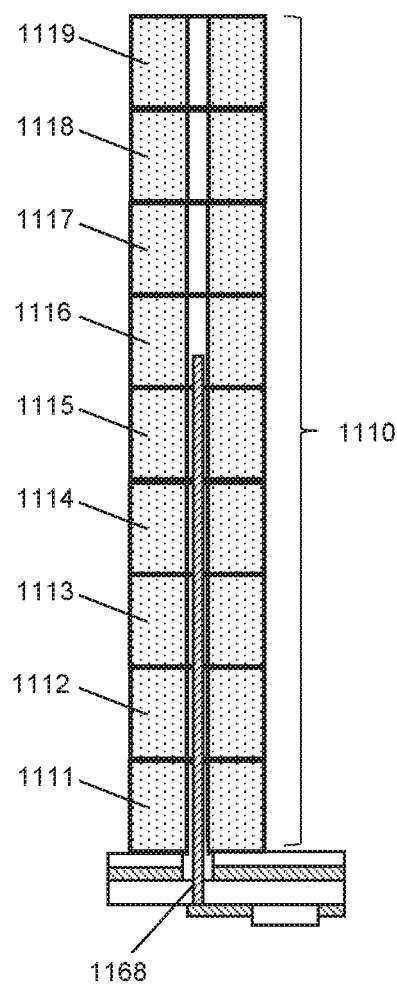

According to an embodiment, the resonators in each set of adjacent dielectric resonators 510-611-618 are "closely e-field and/or capacitively coupled" with each other by positioning the adjacent dielectric resonators 510, 611-618 within a reasonably small distance (e.g., distance 630) of each other. More specifically, the distance 630 between the top and bottom surfaces of the resonators in each set of adjacent dielectric resonators 510, 611-618 is selected so that the adjacent dielectric resonators 510, 611-618 are closely e-field and/or capacitively coupled when a suitable excitation signal is provided to the feed 550. According to an embodiment, the distance 630 between the top and bottom surfaces of the resonators in each set of adjacent dielectric resonators 510, 611-618 is less than one tenth of the wavelength of the resonant frequency of either or both of the dielectric resonators in the set (or one tenth of lambda). For example, for a resonant frequency of about 2.5 GHz, the distance 630 may be about 12.5 millimeters (mm) or less. According to another embodiment, the distance 630 is less than one fiftieth of lambda. For example, for a resonant frequency of about 2.5 GHz, the distance 630 may be about 3.0 mm or less. In some embodiments, the adjacent dielectric resonators 510, 611-618 may be between about 1.0 mm and 2.0 mm apart. In still another embodiment, the distance 630 may be zero for some or all of the sets of adjacent resonators (i.e., the adjacent dielectric resonators 510, 611-618 may be directly physically coupled, as is shown in FIG. 11).

According to an embodiment, the spacing or distance 630 between adjacent resonators in the stack 610 may be established by including spacers 621-628 between some or all sets of adjacent resonators 510, 611-618. The thickness of the spacers 621-628 and the characteristics (e.g., dielectric constant) of the material(s) from which the spacers 621-628 are formed affect the closeness of the capacitive coupling between each set of adjacent resonators 510, 611-618. In various embodiments, a spacer 621-628 may be formed from a rigid or flexible, non-electrically-conductive material with good thermal conductivity, such as fiberglass (e.g., woven fiberglass), polytetrafluoroethylene (PTFE), nylon, or other suitable materials. In embodiments in which the feed 550 extends up through multiple resonators 510, 611-618 in the stack 610, the spacers 621-628 may include central holes that are aligned with the channels 620 through the dielectric resonators 510, 611-618. In some embodiments, structures or materials other than spacers 621-628 may be used to maintain desired distances between the dielectric resonators 510, 611-618.

When the dielectric resonators 510, 611-618 are in close proximity to each other, as described above, the vertical or primary e-field produced by a dielectric resonator (e.g., e-field 442, FIG. 4) may directly impinge upon an adjacent dielectric resonator, which may cause that adjacent resonator also to resonate. For example, a vertical e-field produced by dielectric resonator 510 may directly impinge on adjacent resonator 611, causing the adjacent resonator 611 to resonate at its resonant frequency even though it may not be directly excited by a signal carried on feed 550. Similarly, a vertical e-field produced by dielectric resonator 611 may directly impinge on adjacent resonator 612, causing the adjacent resonator 612 to resonate at its resonant frequency. In a particular example embodiment in which feed 550 only extends into the lowest dielectric resonator 510 (but not into resonators 611-618), for example, a vertical e-field produced by exciter resonator 510 may impinge on adjacent parasitic resonator 611, causing it to resonate. Similarly, the vertical e-field produced by parasitic resonator 611 may impinge on adjacent parasitic resonator 612, causing it to resonate. Assuming the strength of each successive vertical e-field is sufficiently strong, this reaction may continue up through each of the parasitic resonators 611-618 until all resonators 611-618 are resonating at their respective resonant frequencies. In other embodiments, the feed 550 may extend further up through the stack 610, including extending up past the top surface of the highest resonator 618 (e.g., as shown in FIG. 9).

Given an appropriate excitation signal, the exciter and adjacent dielectric resonators 510, 611-618 may be capacitively coupled to each other, and each dielectric resonator 510, 611-618 may be induced to resonate at its resonant frequency either directly by a signal carried on the feed 550 or by a vertical e-field produced by an adjacent capacitively coupled resonator. Accordingly, the resonator stack 610 of FIG. 6 essentially includes a plurality of capacitively coupled resonators 510, 611-618. Each dielectric resonator 510, 611-618 essentially is an antenna that may radiate efficiently in space, thus forming a "distributed antenna." As will be made clearer by the description of FIG. 9, a distributed antenna embodied by a DRA antenna such as stack 610 may couple efficiently to a near-field load (e.g., a food load within a heating chamber), even when the load is relatively small and/or is positioned in various locations with respect to the DRA antenna 500.

In contrast with the vertically-stacked dielectric resonators 510, 611-618, which are arranged in a concentrically-stacked manner, the horizontally-arranged dielectric resonators 510, 511, 520 are arranged in a co-planar manner. In the embodiment of FIG. 5, the horizontally-arranged dielectric resonators 510, 511, 520 includes two exciter resonators 510, 511 and five parasitic resonators 520.

According to an embodiment, the horizontally-arranged resonators 510, 511, 520 are physically coupled to a first side of the substrate 530 to maintain fixed spatial relationships between the dielectric resonators 510, 511, 520. For example, the substrate 530 may be a rigid or flexible, non-electrically-conductive material with good thermal conductivity, such as fiberglass, PTFE, nylon, or other suitable materials. As will be discussed in more detail later in conjunction with FIG. 9, the substrate 530 material may be chosen to provide sufficient electrical isolation from an underlying ground plane, with which the substrate 530 may be slidably engaged.

According to an embodiment, the exciter dielectric resonators 510, 511 and the adjacent parasitic dielectric resonators 520 are oriented in a co-planar manner, in that the top and/or bottom surfaces of the dielectric resonators 510, 511, 520 (or cross-sections taken through the dielectric resonators 510, 511, 520) are co-planar. As with the dielectric resonators in the stack 610, the exciter dielectric resonators 510, 511 and the adjacent dielectric resonators 520 are closely e-field and/or capacitively coupled with each other by positioning the exciter and adjacent dielectric resonators 510, 511, 520 within a reasonably small distance 540 of each other. More specifically, the smallest distance 540 between the sidewalls of adjacent dielectric resonators 510, 511, 520 is selected so that adjacent sets of the dielectric resonators 510, 511, 520 are closely e-field and/or capacitively coupled when suitable excitation signals are provided to the feeds 550, 551. According to an embodiment, the distance 540 between the sidewalls of the exciter dielectric resonators 510, 511 and the adjacent dielectric resonators 520 is less than one tenth of the wavelength of the resonant frequencies of the exciter dielectric resonators 510, 511 (or one tenth of lambda). For example, for a resonant frequency of about 2.5 GHz, the distance 540 may be about 12.5 mm or less. According to another embodiment, the distance 540 is less than one fiftieth of lambda. For example, for a resonant frequency of about 2.5 GHz, the distance 540 may be about 3.0 mm or less. In some embodiments, the exciter and adjacent dielectric resonators 510, 511, 520 may be between about 1.0 mm and 2.0 mm apart. In still another embodiment, the distance 540 may be zero (i.e., the exciter dielectric resonators 510, 511 and the adjacent dielectric resonators 520 may be touching).

When the exciter and adjacent dielectric resonators 510, 511, 520 are in close proximity to each other, as described above, the circumferential or secondary e-fields produced by the exciter dielectric resonators 510, 511 (e.g., e-field 440, FIG. 4) may directly impinge upon the adjacent dielectric resonators 520. This, in turn, may cause the adjacent dielectric resonators 520 to resonate at their respective resonant frequencies. Accordingly, each of dielectric resonators 510, 511 are appropriately classified as an exciter resonator. In contrast, in the embodiment illustrated in FIG. 5, none of the adjacent dielectric resonators 520 are directly excited by a feed. Therefore, they are appropriately classified as parasitic resonators.

Given an appropriate excitation signal, the exciter and adjacent dielectric resonators 510, 511, 520 may capacitively couple to each other, and each dielectric resonator 510, 511, 520 resonates at its resonant frequency. Accordingly, the horizontally-arranged resonators 510, 511, 520 of FIGS. 5 and 6 essentially include a plurality of capacitively coupled resonators 510, 511, 520. As with the resonators 510, 611-618 in the stack 610, each dielectric resonator in the set of horizontally-arranged resonators 510, 511, 520 essentially is an antenna that may radiate efficiently in space, thus also forming a distributed antenna. Such a distributed antenna also may couple efficiently to a near-field load.

Although the exciter resonators 510, 511 each may be excited by a feed 550, 551 positioned within the central hole 512, 513 of the dielectric resonator 510, 511, either or both of the exciter resonators 510, 511 alternatively may be aperture coupled to a microstrip line 560, 561 or other conductive structure, which instead may be used to carry an RF signal for exciting the dielectric resonators 510, 511. In addition or alternatively, an exciter dielectric resonator may be excited by a feed that is placed in a location other than a center hole, and/or multiple feeds may be used to excite a dielectric resonator.

According to an embodiment, the feeds 550, 551 and/or microstrip lines 560, 561 may receive the same RF signal. In various alternate embodiments, the feeds 550, 551 and/or microstrip lines 560, 561 may receive different RF signals (e.g., RF signals at different frequencies and/or power levels), and/or provision of the RF signals to the feeds 550, 551 and/or microstrip lines 560, 561 may be phased. For example, during a first time duration, a first exciter resonator (e.g., resonator 510) may be provided with excitation from its associated feed 550 and/or microstrip line 560, while a second and different exciter resonator 511 may receive no excitation or different excitation from its associated feed 551 and/or microstrip line 560. During a second time duration, the excitation provided to the first exciter resonator 510 may be removed or altered, and the excitation provided to the second exciter resonator 511 may either remain the same, or also be removed or altered. In this way, the cumulative e-fields produced by the DRA array 500 may be varied over time in direction, intensity, frequency, or otherwise. Said another way, by providing multiple feeds 550, 551 and/or microstrip lines 560, 561 and exciting them sequentially or in various combinations, a continuously or incrementally steerable beam or beams may be formed. More specifically, a beam of microwave energy may be steered in azimuth and/or elevation by activating the multiple feeds 550, 551 and/or microstrip lines 560, 561 individually or in combination.

Although the stack 610 of dielectric resonators 510, 611-618 best illustrated in the embodiment of FIG. 6 includes nine resonators 510, 611-618, alternate embodiments of dielectric resonator stacks may include more or fewer resonators (e.g., including a stack with as few as two resonators). Further, although the horizontally-arranged dielectric resonators best illustrated in FIG. 5 includes seven dielectric resonators 510, 511, 520, alternate embodiments of a horizontally-arranged set of resonators may include more or fewer resonators (e.g., any number of dielectric resonators in a range of two to thirty or more). In addition, in the embodiments illustrated in FIGS. 5 and 6, all of the dielectric resonators 510, 511, 520, 611-618 are sufficiently the same size and shape. Assuming they all are formed from one or more materials with the same dielectric constant, each of the dielectric resonators 510, 511, 520, 611-618 will resonate at substantially the same resonant frequency. In alternate embodiments, dielectric resonators may be selected that resonate at different resonant frequencies. This may be accomplished by using dielectric resonators of different sizes, dielectric resonators of different shapes, and/or dielectric resonators with different dielectric constants, for example.

Figure 7:
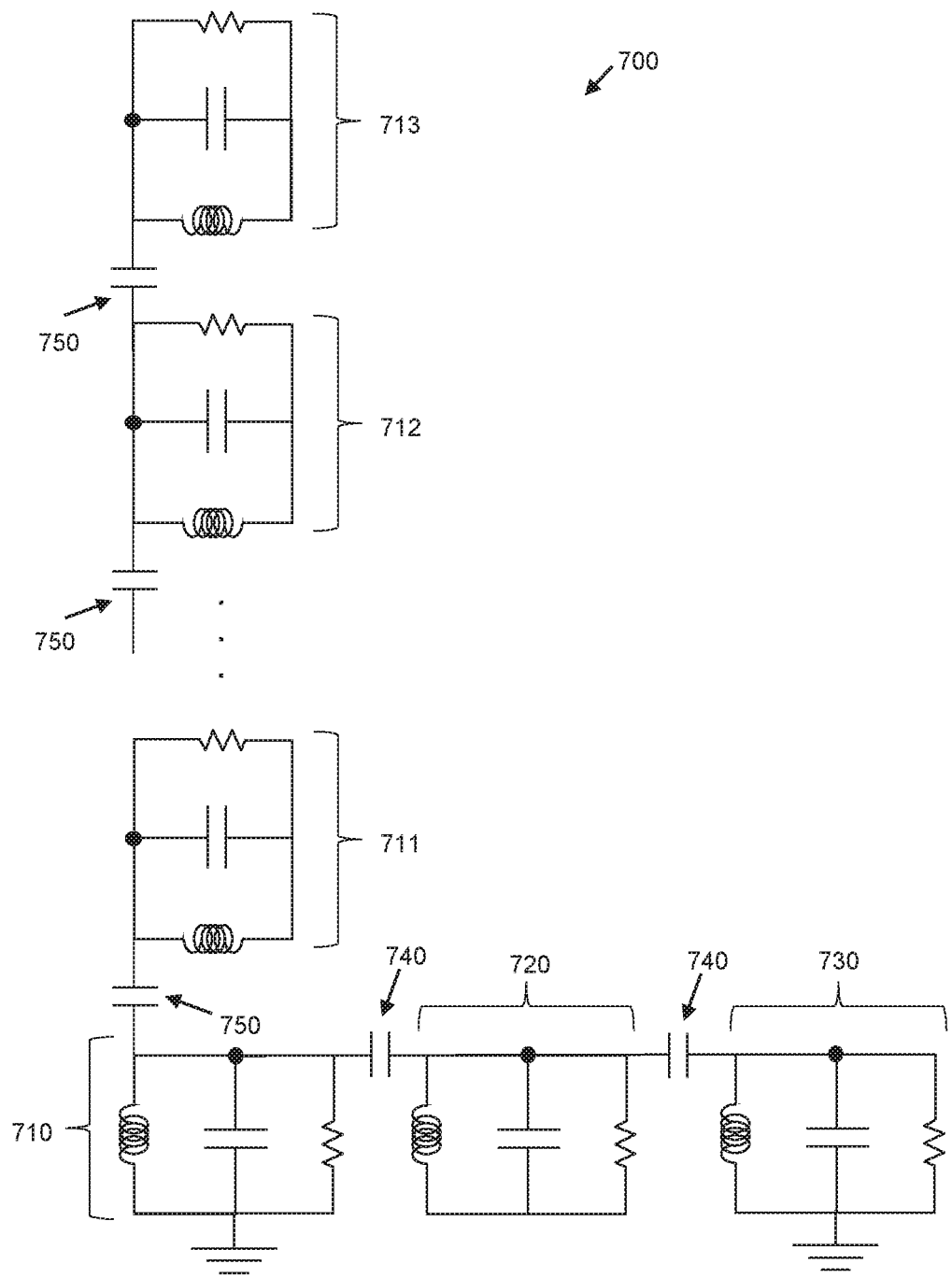
FIG. 7 is a circuit diagram representing the electrical characteristics of a DRA array with vertically-stacked and horizontally-arranged adjacent dielectric resonators, in accordance with an embodiment.

FIG. 7 is a circuit diagram 700 representing the electrical characteristics of a DRA with a plurality of adjacent vertically-stacked dielectric resonators and three adjacent horizontally-arranged dielectric resonators, in accordance with an embodiment. More specifically, a first resonant circuit 710 represents an exciter dielectric resonator (e.g., dielectric resonator 510, FIG. 5), and second and third adjacent resonant circuits 720, 730 represent horizontally-arranged parasitic dielectric resonators (e.g., two of dielectric resonators 520, FIG. 5) positioned adjacent to the first (exciter) resonator 710. In addition, resonant circuits 711-713 represent additional dielectric resonators stacked on the exciter resonator (represented by circuit 710). According to an embodiment, a feed is placed in proximity to the exciter dielectric resonator (or the first resonant circuit 710), and through capacitive coupling, the exciter dielectric resonator (or the first resonant circuit 710) couples to the parasitic dielectric resonators (or to resonant circuits 711-713, 720, 730).

As discussed above, the parasitic dielectric resonators may be placed in close enough proximity to the exciter dielectric resonator to ensure that the resonators are closely capacitively coupled, as represented by capacitors 740, 750. Essentially, the horizontal capacitive coupling (i.e., the value of capacitors 740) between the resonant circuits 710, 720, 730 is inversely related to the distance between the dielectric resonators represented by the resonant circuits 710, 720, 730, and is also affected by the characteristics (e.g., dielectric constant) of any material (e.g., conformal coating 982, FIG. 9) that may be positioned between adjacent resonators. Similarly, the vertical capacitive coupling (i.e., the value of capacitors 750) between the resonant circuits 710-713 is inversely related to the distance between the dielectric resonators represented by the resonant circuits 710-713, and is also affected by the characteristics (e.g., dielectric constant) of any spacers (e.g., spacers 621-628, FIG. 6) that may be positioned between adjacent resonators. Different spacings between the dielectric resonators and different characteristics of any material between the dielectric resonators results in different intensities of the capacitive coupling and different frequency responses. More specifically, changes in the frequency response may significantly affect the bandwidth of the circuit 700. In some embodiments, the dielectric resonators may be sized, shaped, and positioned with respect to each other to create a relatively broadband circuit 700. In other words, the individual dielectric resonators may be positioned (or coupled together) to give a composite broadband response.

In the electrical representation of FIG. 7, each resonant circuit 710-713, 720, 730 includes an inductor and capacitor in parallel (which together form the resonator), and a resistance (Rr), which represents the radiation resistance. More specifically, as a DRA array represented by circuit 700 is used to radiate energy into a heating chamber, the radiation resistance represents the energy loss into the chamber as a result of radiation of energy away from the DRA array. Each of the resonators in resonant circuits 710-713, 720, 730 may radiate at the same frequency (e.g., when the dielectric resonators are identical), or the resonators in resonant circuits 710-713, 720, 730 may resonate at different frequencies (e.g., when the dielectric resonators are different in size, shape, and/or dielectric constant).

Figure 8:
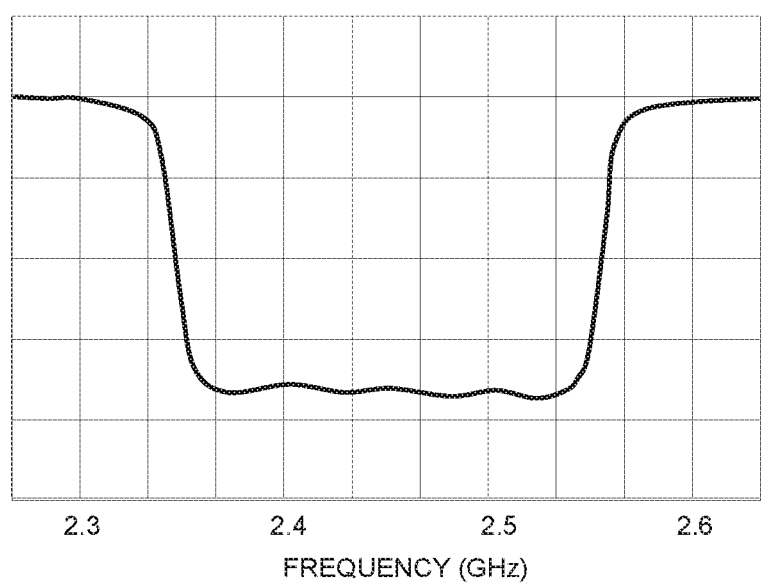
FIG. 8 is a graph depicting the gain bandwidth of a DRA array, in accordance with an embodiment.

FIG. 8 is a graph depicting the gain bandwidth of a DRA array (e.g., DRA array 500, FIG. 5), in accordance with an embodiment. More specifically, the graph depicts the gain bandwidth of an embodiment of a DRA antenna with an unloaded center frequency of about 2.45 GHz. A DRA with a single dielectric resonator may have a fairly narrowband response (e.g., between about 2.4 GHz and 2.5 GHz). However, embodiments of DRA arrays discussed above (and later) include at least one DRA and one or more adjacent dielectric resonators, which technically increases the aperture of the antenna, resulting in a significantly wider band response (e.g., about 200 megahertz bandwidth between about 2.3 GHz and 2.6 GHz at the −10 dB points).

Due to the relatively wideband response, and as will be discussed in more detail below, embodiments of DRA arrays may be significantly less sensitive to near-field loads than conventional monopole antennas, patch antennas, or other types of narrowband antennas. This makes the DRA array embodiments particularly well suited to microwave heating applications in which the heating chamber is in close proximity to the radiating element (in this case the DRA array). As is known in antenna theory, a substantial near-field load may cause a relatively narrow-band antenna to become de-tuned to the extent that the energy produced by the antenna shifts out of the desired, unloaded band. If this were the case in a microwave heating application, the antenna would be incapable of launching energy into the heating chamber. However, the wideband response of the various embodiments of DRA array structures ensures that the DRA array structures may launch significant energy within the band of interest (e.g., within a band centered around 2.45 GHz) into the heating chamber and the load, even when the load is a near-field load (e.g., a food load placed in a heating chamber to which the DRA array structure is proximate). In other words, even if a near-field load causes the DRA array structure response to move in frequency, the embodiments of DRA array structures are wideband enough that the response does not move outside of the relatively wide band, thus enable efficient energy transfer into the near-field load. The DRA array creates a broadband frequency response, which is significantly less sensitive to near-field loads and load positions within the heating chamber. In addition, the wideband response of the DRA array embodiments ensures that energy may be efficiently provided to food loads with a wide range of dielectric constants. Because of the wide bandwidth of the various embodiments of DRA arrays, the launch efficiency into an adjacent heating chamber may be as high as 95 percent or more.

FIG. 9 is a cross-sectional, side view of the portable microwave heating apparatus 100 of FIGS. 1 and 2, in accordance with an example embodiment. Microwave heating apparatus 900 includes a housing 910, a heating chamber 920, a system controller (e.g., system controller 310, not illustrated in FIG. 9), a user interface (e.g., user interface 330, not illustrated in FIG. 9), a power supply system (e.g., power supply system 340, not illustrated in FIG. 9), a microwave power generation module 950 (e.g., module 350, FIG. 3), a vertically-stacked DRA array 960, a horizontally-arranged DRA array 962, and other components that are discussed in more detail below. According to an embodiment, and as will be discussed in detail below, a horizontally-arranged DRA array 962 may be positioned within a base portion 912 of the housing 910, and a vertically-stacked DRA array 960 may extend upward from the base portion 912. In alternate embodiments, a vertically-stacked DRA array and/or a horizontally-arranged DRA array may be oriented orthogonally to the orientations shown in FIG. 9.

The housing 910 includes the base portion 912, a chamber portion 914, and a lid 916 (which is in a closed state in FIG. 9), in an embodiment. The heating chamber 920 is located within the chamber portion 914 of the housing 910, and extends up into the interior of the lid 916, in an embodiment. The heating chamber 920 is defined by interior side walls 922, a chamber bottom surface 924, and a chamber top surface 926. FIG. 9 shows a load 940 (e.g., a food load or other load) within the chamber 920. With lid 916 closed, as shown in FIG. 9, the heating chamber 920 is an enclosed air cavity, which essentially functions as a waveguide with a blocked end, as described previously. In the illustrated embodiment, the heating chamber 920 has a substantially circular cross-section, making the heating chamber 920 a cylindrical waveguide. In other embodiments, the chamber may have a rectangular cross-section, an elliptical cross-section, or a cross-section having another shape.

The chamber walls may be formed from a material with good thermal conductivity, in an embodiment. For example, the chamber walls may be formed from copper, aluminum, steel, or another suitable material. In some embodiments, the interior side walls 922 of the chamber 920 may be coated with a material that affects the frequency of the chamber 920. For example, the interior side walls 922 may be coated with PTFE, nylon, or another suitable material, which may reduce or otherwise affect the frequency of the chamber 920.

According to an embodiment, the base portion 912 of the housing 910 contains the horizontally-arranged DRA array 962 and at least one electronics substrate 970, and the vertically-stacked DRA array 960 extends upward from the electronics substrate 970 into the chamber 920. For example, the electronics substrate 970 may include a microwave or RF laminate, a PTFE substrate, a printed circuit board (PCB) material substrate (e.g., FR-4), an alumina substrate, a ceramic tile, or another type of substrate. According to an embodiment, the electronics substrate 970 includes a conductive ground plane 972 on or proximate to a first surface of the electronics substrate 970 (e.g., the upper surface in FIG. 9), and one or more other conductive layers, some of which may be patterned to provide electrical interconnects between various components mounted to the electronics substrate 970. For example, components corresponding to the system controller, portions of the user interface, the power supply, and the microwave power generation module 950, may be mounted to a second surface of the electronics substrate 970 (e.g., the lower surface in FIG. 9), in an embodiment, and those components may be electrically coupled to each other through patterned conductive layers on or below the second surface.

The vertically-stacked and horizontally-arranged DRA arrays 960, 962 may be configured similarly to the vertically-stacked and horizontally-arranged DRA arrays in the compound DRA array 500, FIG. 5, in an embodiment, although they may be differently configured, as well. The vertically-stacked DRA array 960 includes an exciter resonator 964 and eight additional resonator(s) 965, where the additional resonator(s) 965 are closely capacitively coupled to the exciter resonator 964 or to each other, as previously described. In the illustrated embodiment, because the feed 968 extends up through all of the additional resonators 965, each of the additional resonators 965 also may be classified as an exciter resonator. The horizontally-arranged DRA array DRA array 962 includes at least two exciter resonators 964, 966 and one or more adjacent parasitic resonator(s) 967, where the parasitic resonator(s) 967 are closely capacitively coupled to the exciter resonator(s) 964, 966, as previously described. As described in conjunction with FIG. 5, the exciter and parasitic resonators 964, 966, 967 may be coupled to a DRA array substrate 980 (e.g., substrate 530, FIG. 5), which is slidably engaged with the first surface of the electronics substrate 970 (e.g., with the ground plane 972).

According to an embodiment, a non-electrically-conductive conformal coating 982 encases the DRA arrays 960, 962. The conformal coating 982 functions to protect the DRA arrays 960, 962 from moisture and other contaminants (e.g., food splatter), defines the bottom surface 924 of the chamber 920, and also defines a portion of a side surface 923 of the chamber 920. For example, the conformal coating 982 may include a non-conductive encapsulant material, such as a thermos-setting plastic, plastic ABS, an epoxy resin, PTFE, or another suitable material. In an alternate embodiment, an alternative structure (e.g., a cover) may be used to provide a physical barrier between the DRA arrays 960, 962 and the chamber 920, rather than including the conformal coating 982.

A first feed 968 configured to carry an RF signal is positioned within the central hole of exciter resonator 964, and extends up through vertically aligned central holes of the additional resonators 965 that are stacked on the exciter resonator 964, in the illustrated embodiment. In addition, a second feed 969 configured to carry the same or a different RF signal is positioned within the central hole of exciter resonator 966. According to an embodiment, the diameters of the feeds 968, 969 are smaller than the diameters of the central holes of the resonators 964, 966 so that the feeds 968, 969, when they experience thermal expansion, do not compress against the interior sidewalls of the central holes and potentially cause the resonators 964, 966 to crack. So configured, the exciter resonator 964 and the feed 968 form a first DRA, the exciter resonator 966 and the feed 969 form a second DRA, and the DRAs and the additional resonators 965, 967 form the first and second DRA arrays 960, 962.

As described previously, the microwave power generation module 950 includes tuning circuitry (e.g., tuning circuitry 354, FIG. 3), bias circuitry (e.g., bias circuitry 356, FIG. 3), and an oscillator subsystem (e.g., oscillator subsystem 352, FIG. 3). The oscillator subsystem includes one or more power transistors 952, in an embodiment. To facilitate provision of oscillating RF signals to the feeds 968, 969, one or more outputs (e.g., drain terminals) of one or more power transistors 952 (or the outputs of one or more power amplifiers) is electrically coupled to the feeds 968, 969 through conductive transmission lines 954 on or below the second surface of the electronics substrate 970. The feeds 968, 969 extend through holes in the electronics substrate 970, through holes in the DRA array substrate 980, and into the central holes in the exciter resonators 964, 966.

In response to user inputs provided via the user interface (e.g., via control panel 130, FIG. 1), the system controller (e.g., controller 310, FIG. 3) causes the microwave power generation module 950 to provide one or more excitation signals to the DRA array(s) 960, 962. Each DRA array 960, 962, in response, radiates electromagnetic energy (indicated by shaded area 990) into the heating chamber 920. The microwave energy increases the thermal energy of the load 940, and may cause the load to heat up.

As described above, when appropriately excited by RF signals carried on the feeds 968, 969, the exciter resonators 964, 966 resonate at their resonant frequency (or frequencies) and each produce a circumferential e-field (e.g., e-field 440, FIG. 4) and a vertical e-field (e.g., e-field 442, FIG. 4). According to an embodiment, the circumferential e-fields directly impinge on the parasitic resonators 967, causing them to resonate at their resonant frequency (or frequencies). This causes the parasitic resonators 967 also to produce circumferential and vertical e-fields. Essentially, each resonator 964-967 of the DRA arrays 960, 962 has a radiation pattern. Given the nature of the e-fields and the presence of ground plane 972 and sidewalls 922, the cumulative radiation is directed toward and into the chamber 920 in fairly directional beams. In other words, each DRA array 960, 962 operates as an antenna array that directs a fairly narrow, fixed beam of electromagnetic energy into the chamber 920.

For example the first DRA array 960 may produce a beam of electromagnetic energy in a direction that is orthogonal to the chamber sidewall 922, which direction generally is indicated by arrow 992. Similarly, the second DRA array 962 may produce a beam of electromagnetic energy in a direction that is orthogonal to the bottom surface 924 of the chamber 920, which direction is generally indicated by arrow 994. As is apparent from FIG. 9, the beams of electromagnetic energy produced by the first and second DRA arrays 960, 962 have substantially orthogonal orientations. In addition, although the first and second DRA arrays 960, 962 may be operated at substantially the same frequency, they alternatively may be operated at different frequencies to provide more broadband energy coupling to the load 940 within the chamber 920.

As mentioned previously, the chamber 920 essentially functions as an electromagnetic waveguide with a blocked end, where electromagnetic waves within the chamber 920 generally propagate in directions from the DRA arrays 960, 962 toward the top and side surfaces 922, 926 of the chamber 920. More particularly, electromagnetic waves may propagate through the chamber 920 in one or more propagation modes, including one or more transverse electric (TE) modes, transverse magnetic (TM) modes, and/or hybrid transverse electric and magnetic (TEM) modes. However, the electromagnetic waves will propagate in the chamber 920 only when the frequency of the electromagnetic energy produced by the DRA array(s) 960, 962 exceeds a lower threshold or minimum frequency for the chamber 920, which is commonly referred to as the cutoff frequency.

The cutoff frequency for the chamber 920 is defined by the size (e.g., defined by height and diameter) and shape (e.g., cylindrical, rectangular, elliptical, and so on) of the chamber 920. According to an embodiment, and not accounting for the loading that occurs as a result of the presence of the DRA arrays 960, 962 or a load 940 present within the chamber 920, the size and shape of the chamber 920 renders the chamber 920 as being below cutoff. In other words, in the desired band of operation for microwave heating (e.g., between 2.3 GHz and 2.6 GHz, and referred to below as the "microwave heating band"), and absent the DRA array(s) 960, 962 and load 940, the chamber 920 is configured so that no mode can propagate in the chamber 920 for electromagnetic energy within the microwave heating band, regardless of how it is excited. For example, the chamber 920 may have a size and shape which may not support any propagation mode when excited by electromagnetic energy below 3.0 GHz, when unloaded.

However, in microwave heating apparatus 900, and due in part to the high dielectric constant(s) of the dielectric resonators 964-967, the DRA arrays 960, 962 function to load the chamber 920 in a manner that enables one or more modes to propagate within the chamber 920 in the microwave heating band. In other words, the loading provided by the DRA arrays 960, 962 bring the chamber 920 to a resonant frequency that is within the microwave heating band (i.e., the chamber 920 is not below cutoff when loaded with the DRA arrays 960, 962). Said another way, the cutoff frequency of an otherwise below-cutoff chamber 920 is lowered into the microwave heating band by including either or both of the DRA arrays 960, 962 within the chamber 920, in an embodiment. Accordingly, one or more modes may be propagated within the chamber 920 when the chamber is excited with electromagnetic energy (from the DRA arrays 960, 962) that is within the microwave heating band, even though the unloaded chamber 920 may be too small to support propagation of those modes.

Depending on the shape, size, and cutoff frequency of the loaded chamber 920, it will almost naturally find the best mode of propagation, in an embodiment. Desirably, the chamber 920 is designed to support hybrid and/or complex modes, which may be advantageous in that even heating of an inserted load 940 may be enhanced when electromagnetic chaos is created within the chamber 920. In other words, when multiple modes and/or higher order modes are propagated in the chamber 920, even heating across the load 940 may be more readily achieved. Because the feeds 968, 969 may enable e-fields to be produced in three orthogonal directions (e.g., X, Y, and Z), the dominant mode in the chamber 920 automatically may be excited.

Essentially, the DRA arrays 960, 962 are configured to couple energy into the chamber 920 efficiently, even though the chamber 920 may be below cutoff, in some embodiments. Although embodiments of microwave heating apparatus 900 may include a below-cutoff, unloaded chamber 920, as described above, in other embodiments, the unloaded chamber 920 may be sized and shaped to render the chamber 920 above cutoff (or capable of supporting one or more propagation modes when excited by electromagnetic energy within the microwave heating band, even in the absence of loading by DRA arrays 960, 962.

During operation, the load 940 (e.g., a food load) provides additional loading in the chamber 920, in addition to the loading provided by the DRA arrays 960, 962. More specifically, when placed as shown in FIG. 9, the load 940 is in the near field for DRA arrays 960, 962. Using a conventional antenna (e.g., a monopole or patch antenna), such near field loading may de-tune the antenna to the degree that the antenna could not couple energy into the chamber or the load. However, as discussed in detail previously, the broadband characteristics of the DRA arrays 960, 962 make them much more insensitive to near-field loading. Accordingly, even in the presence of the near-field load 940, the DRA arrays 960, 962 may efficiently couple energy into the chamber 920 and the load 940.

Figure 10:
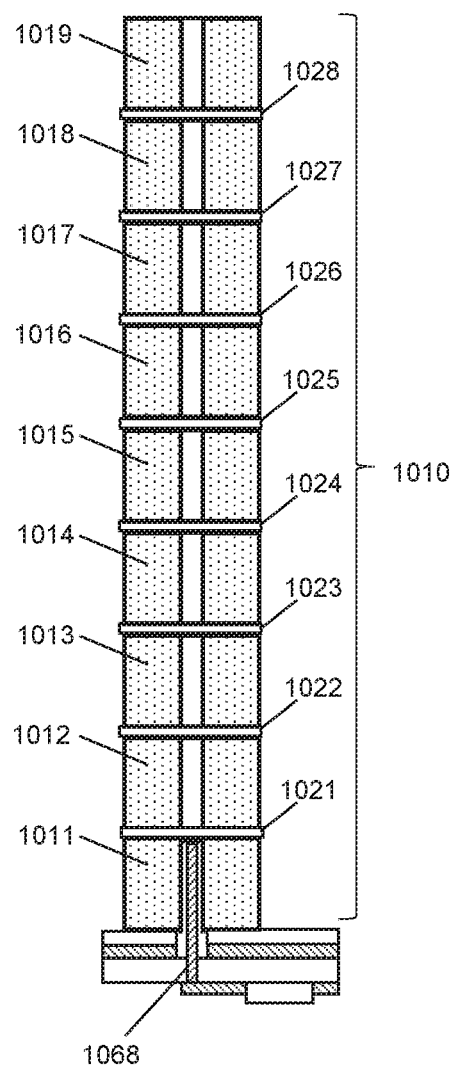
FIGS. 10-14 are cross-sectional or perspective, side views of vertically-stacked DRA arrays, in accordance with several other example embodiments.

In the embodiment of FIG. 9, the feed 968 extends through all of the dielectric resonators 964, 965 in the stack of resonators. In fact, the feed 968 actually extends beyond the top surface of the highest resonator 965 in the stack. Accordingly, each of the resonators 964, 965 may be directly excited by a signal carried on the feed 968, and each of the resonators 964, 965 may be classified as an exciter resonator. In alternate embodiments, a feed may not extend all the way through the stack. For example, FIG. 10 illustrates a cross-sectional, side view of a stack 1010 of dielectric resonators 1011-1019, according to another embodiment, which may be used in a microwave heating apparatus. In the embodiment of FIG. 10, the stack 1010 more specifically includes nine dielectric resonators 1011-1019, eight spacers 1021-1028 disposed between adjacent dielectric resonators 1011-1019, and a feed 1068, which only extends up into the lowest dielectric resonator 1011 in the stack 1010. In some embodiments, structures or materials other than spacers 1021-1028 may be used to maintain desired distances between the dielectric resonators 1011-1019.

In such an embodiment, the lowest dielectric resonator 1011 may be directly excited and caused to resonate by a signal carried on the feed 1068. Thus, the lowest dielectric resonator 1011 may be considered an exciter resonator. In contrast, because the feed 1068 does not extend up into dielectric resonators 1012-1019, those dielectric resonators 1012-1019 may be considered to be parasitic resonators. Given an appropriate excitation signal, the lowest dielectric resonator 1011 may resonate and produce a vertical primary e-field extending upward from the top surface of the exciter resonator 1011 and a circumferential secondary e-field around the exciter resonator 1011. Due to fringing effects, adjacent dielectric resonator 1012 also may be directly excited by and caused to resonate by a signal carried on the feed 1068. In addition, the primary e-field produced by exciter resonator 1011 may directly impinge upon adjacent dielectric resonator 1012, which may cause dielectric resonator 1012 also to resonate and produce vertical and circumferential e-fields. When the dielectric resonator stack 1010 is contained within a chamber (not illustrated) that is positioned adjacent to the sidewalls of the resonators 1011-1019, the chamber may reflect at least the energy from the exciter resonator 1011, and that reflected energy will impinge upon dielectric resonators 1012-1019. Resonators 1012-1019, in response, may re-radiate the energy received from the chamber, thus increasing the chaos of the energy within the chamber (or disturbing the field strength distribution within the chamber). In this manner, the field strength distribution throughout the chamber may be more even, when compared with an antenna that includes only a single resonator. The cumulative e-fields produced by the exciter resonator 1211 and the overlying dielectric resonators 1011-1019 in the stack 1010 may couple with a load within the chamber, and due to the relatively even field distribution within the chamber, the load may be more uniformly heated, when compared with heating that may be achieved using a single resonator.

As discussed above, the physical and material characteristics of spacers 1021-1028 affect the strength of the e-field and/or capacitive coupling between adjacent resonators 1011-1019. In an alternate embodiment, a stack of dielectric resonators may exclude spacers, and the dielectric resonators may be directly physically connected together (e.g., spacing 630, FIG. 6 is zero). For example, FIG. 11 illustrates a cross-sectional, side view of a stack 1110 of dielectric resonators 1111-1119, according to another embodiment, which may be used in a microwave heating apparatus. In the embodiment of FIG. 11, the stack 1110 more specifically includes nine dielectric resonators 1111-1119, and a feed 1168, which extends up into the stack 1110. In contrast to the previous embodiments, adjacent dielectric resonators 1111-1119 in the stack 1110 are directly physically connected together. Accordingly, although adjacent resonators still may be considered to be closely capacitively coupled together, the value of the capacitive coupling is significantly lower than in embodiments in which a dielectric spacer is positioned between adjacent resonators.

The embodiment of FIG. 11 also shows a feed 1168 that extends through or into several dielectric resonators 1111-1116 in the stack 1110, but not through all resonators 1111-1119 in the stack 1110. In the illustrated embodiment, resonators 1111-1116 may be directly excited by a signal carried on the feed 1168, and thus resonators 1111-1116 may be considered to be exciter resonators. Conversely, resonators 1117-1119 may be considered to be parasitic resonators.

Figure 12:
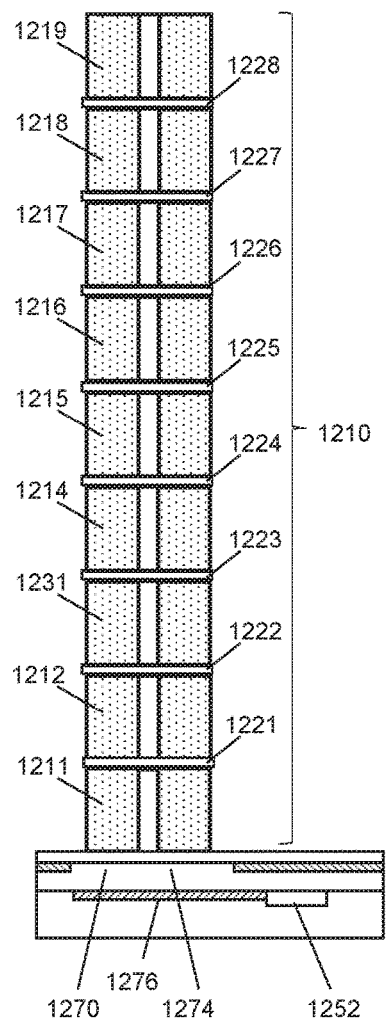

As mentioned previously, alternate embodiments of microwave heating apparatus may include dielectric resonators that are aperture coupled to an RF signal source, rather than being coupled through a feed (e.g., feed 968, FIG. 9) that is positioned within a at least one exciter resonator (e.g., resonator 964) of the DRA array. For example, FIG. 12 illustrates a cross-sectional, side view of a stack 1210 of dielectric resonators 1211-1219, according to yet another embodiment, in which the lowest resonator 1211 in the stack 1210 is aperture-coupled to the RF signal source. In the embodiment of FIG. 12, the stack 1210 more specifically includes nine dielectric resonators 1211-1219, eight spacers 1221-1228 (which may be excluded, in another embodiment), and a substrate 1270. In contrast to the previous embodiments, adjacent dielectric resonators 1111-1119 in the stack 1110 are directly physically connected together. Accordingly, although adjacent resonators still may be considered to be closely capacitively coupled together, the value of the capacitive coupling is significantly lower than in embodiments in which a dielectric spacer is positioned between adjacent resonators.

The substrate 1270 includes a conductive ground plane 1272 on or proximate to a first surface of the substrate 1270 (e.g., the upper surface in FIG. 12), and one or more other conductive layers, some of which may be patterned to provide electrical interconnects between various components mounted to the substrate 1270. For example, components corresponding to the system controller, portions of the user interface, the power supply, and the microwave power generation module, may be mounted to a second surface of the substrate 1270 (e.g., the lower surface in FIG. 12), in an embodiment, and those components may be electrically coupled to each other through patterned conductive layers on or below the second surface.

According to an embodiment, the ground plane 1272 includes an opening or aperture 1274 underlying the lowest (exciter) resonator 1211. In addition, a microstrip line 1276 or other conductive structure on or below a surface (e.g., the lower surface, in FIG. 12) of the electronics substrate 1270 underlies the aperture 1274 in the ground plane 1272, and also underlies the exciter resonator 1211.

The microstrip line 1276 is electrically coupled to an output of the oscillator subsystem (e.g., oscillator subsystem 352, FIG. 3), and more particularly to an output (e.g., a drain terminal) of a power transistor 1252 of the oscillator subsystem, in an embodiment. When the microstrip line 1276 is provided with a suitable RF signal, the microstrip line 1276 produces electromagnetic energy that is coupled through the electronics substrate 1270, and more particularly through the aperture 1274 in the ground plane 1272, to the exciter resonator 1211. When the coupled RF energy is sufficient to cause the exciter resonator 1211 to resonate and produce its own primary e-field extending upward from the top surface of the exciter resonator 1111, that e-field may directly impinge on the adjacent parasitic resonator 1212. In addition, the exciter resonator 1211 may produce a circumferential secondary e-field around the exciter resonator 1211. When the dielectric resonator stack 1210 is contained within a chamber (not illustrated) that is positioned adjacent to the sidewalls of the resonators 1211-1219, the chamber may reflect at least the energy from the exciter resonator 1211, and that reflected energy will impinge upon dielectric resonators 1212-1219. Resonators 1212-1219, in response, may re-radiate the energy received from the chamber, thus increasing the chaos of the energy within the chamber (or disturbing the field strength distribution within the chamber), as discussed previously in conjunction with FIG. 10.

Figure 13:
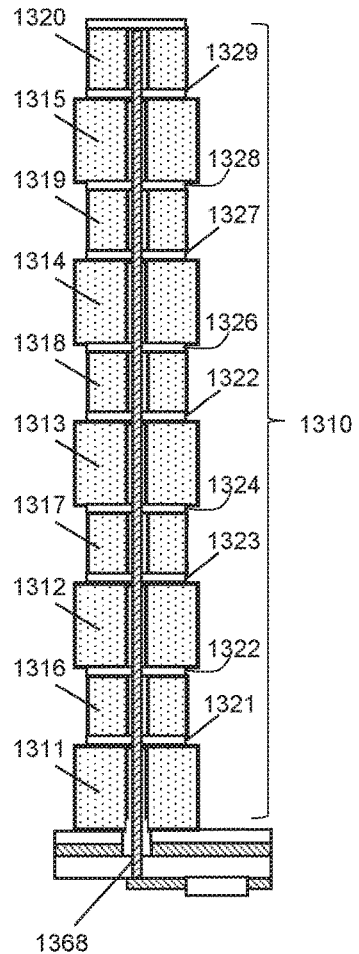

In some other alternate embodiments, a DRA array may include dielectric resonators that resonate at different frequencies. As discussed previously, this may be accomplished by using dielectric resonators of different sizes, dielectric resonators of different shapes, and/or dielectric resonators with different dielectric constants, for example. FIG. 13 is a cross-sectional, side view of a stack 1310 of dielectric resonators 1311-1320, according to another embodiment, which may be used in a microwave heating apparatus, and which includes dielectric resonators of different sizes. In the embodiment of FIG. 13, the stack 1310 more specifically includes five dielectric resonators 1311-1315 of a first size, five dielectric resonators 1316-1320 of a second (smaller) size, nine spacers 1321-1329 disposed between adjacent dielectric resonators 1311-1320, and a feed 1368, which extends up through all of the resonators 1311-1320 in the stack 1310.

As stated above, and in contrast with the previously-described DRA arrays, the dielectric resonators 1311-1320 are of different sizes. Assuming that the dielectric resonators 1311-1320 are formed from material(s) having the same dielectric constant, the size difference results in the dielectric resonators 1311-1320 resonating at different resonant frequencies. For example, the largest dielectric resonators 1311-1315 may resonate at a first resonant frequency, and the smaller dielectric resonators 1316-1320 may resonate at a second higher resonant frequency. As a result of the differences in the resonant frequencies, the cumulative e-field emanating from the DRA array 1310 may be non-orthogonal to the side surfaces (e.g., side surface 416) of the dielectric resonators 1311-1320. Although the resonator stack 1310 is shown to included resonators 1311-1320 of two different sizes in an alternating arrangement, other embodiments may include more than two different sizes of resonators (or resonators that resonate at more than two frequencies), and/or the differently-sized resonators may be arranged in an arrangement other than an alternating arrangement (e.g., from largest to smallest, smallest to largest, smaller resonators in the center of the stack, smaller resonators at the end(s) of the stack, and so on).

Although e-field steering is accomplished in the DRA array 1310 of FIG. 13 by incorporating differently sized dielectric resonators 1311-1320 (thus resonators with different resonant frequencies) into the array 1310, similar beam-steering effects may be accomplished in other ways. For example, e-field steering alternatively may be accomplished by incorporating dielectric resonators with different dielectric constants into an array, by incorporating differently-shaped dielectric resonators into an array, or by varying the spacing, and thus the strength of the capacitive coupling, between sets of adjacent dielectric resonators. By incorporating dielectric resonators with various resonant frequencies into a DRA array, a system may be designed in which the cumulative e-field is directed in one or more directions other than orthogonally from the top surfaces of the dielectric resonators.

Figure 14:
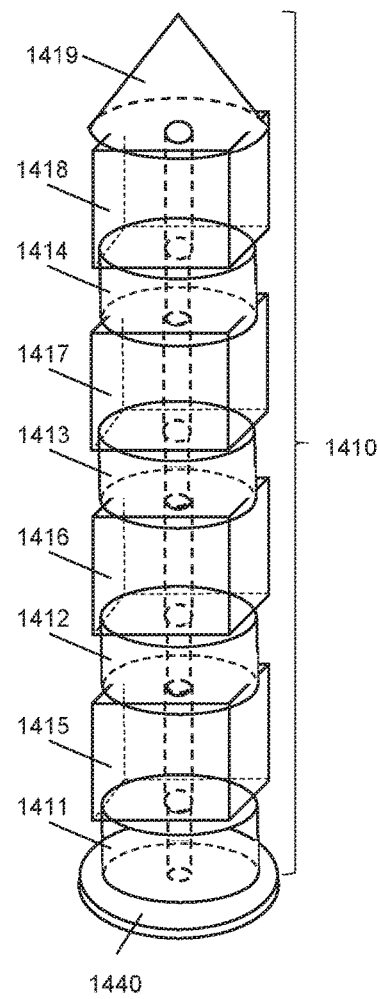
Figure 15:
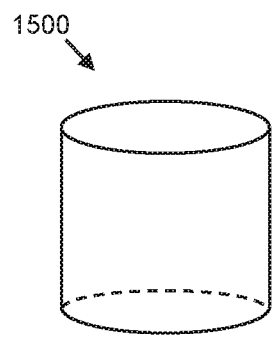
FIGS. 15-20 are perspective views of dielectric resonators having various shapes.
Figure 16:
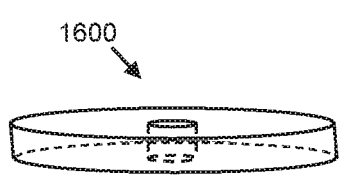
Figure 17:
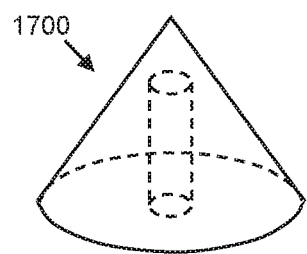
Figure 18:
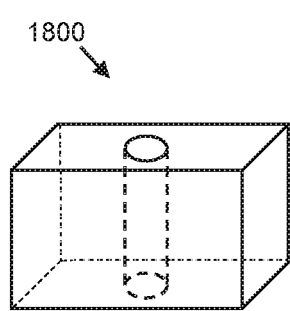
Figure 19:
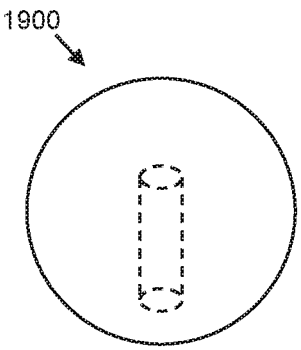
Figure 20:
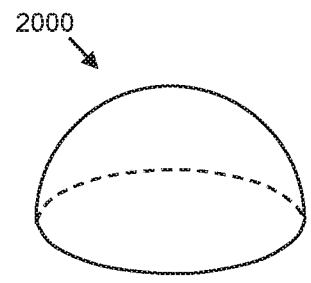

As indicated above, in some other alternate embodiments, a DRA array may include dielectric resonators that have different physical configurations, and thus dielectric resonators that resonate at different frequencies and/or have different e-field distributions. For example, FIG. 14 is a perspective view of a stack 1410 of dielectric resonators 1411-1419, according to yet another embodiment, which includes dielectric resonators 1410, 1420, 1430 of different physical configurations, in accordance with yet another example embodiment. DRA array stack 1410 includes nine dielectric resonators 1411-1419 coupled to a substrate 1440, including at least one exciter resonator (e.g., the lowest resonator 1411 and any one or more of the higher resonators 1412-1419 in the stack 1410) and potentially adjacent parasitic resonators (e.g., any one or more of resonators 1411-1419 that are not directly excited by a feed).

In contrast with the previously-described DRA arrays, the dielectric resonators 1411-1419 are of different physical configurations. More specifically, in the illustrated embodiment, a plurality of first dielectric resonators 1411-1414 have a substantially cylindrical shape with a central hole, a plurality of second dielectric resonators 1415-1418 have a substantially cubic or parallelepiped shape with a central hole, and a third dielectric resonator 1419 has a cone shape with no central hole. Assuming that the dielectric resonators 1411-1419 are formed from material(s) having the same dielectric constant, the physical configuration differences result in the first, second, and third dielectric resonators 1411-1414, 1415-1418, and 1419 each resonating at different resonant frequencies and/or producing e-fields that have different distributions.

The embodiment of FIG. 14 illustrates that a variety of differently configured dielectric resonators may be utilized in various embodiments of a DRA array. To illustrate the point even further, FIGS. 15-20 are perspective views of dielectric resonators 1500, 1600, 1700, 1800, 1900, 2000 with various physical configurations, and which may be used in a DRA array. More specifically, dielectric resonator 1500 (FIG. 15) has a cylindrical shape with no central hole, dielectric resonator 1600 (FIG. 16) has a flattened disk shape with a central hole, dielectric resonator 1700 (FIG. 17) has a cone shape with a central hole, dielectric resonator 1800 (FIG. 18) has a parallelepiped shape with a central hole, dielectric resonator 1900 (FIG. 19) has a spherical shape with a central hole, and dielectric resonator 2000 (FIG. 20) has a dome shape with no central hole. Any of a wide variety of differently configured dielectric resonators with or without central holes, or with other openings, alternatively may be used in various embodiments.

Figure 21:
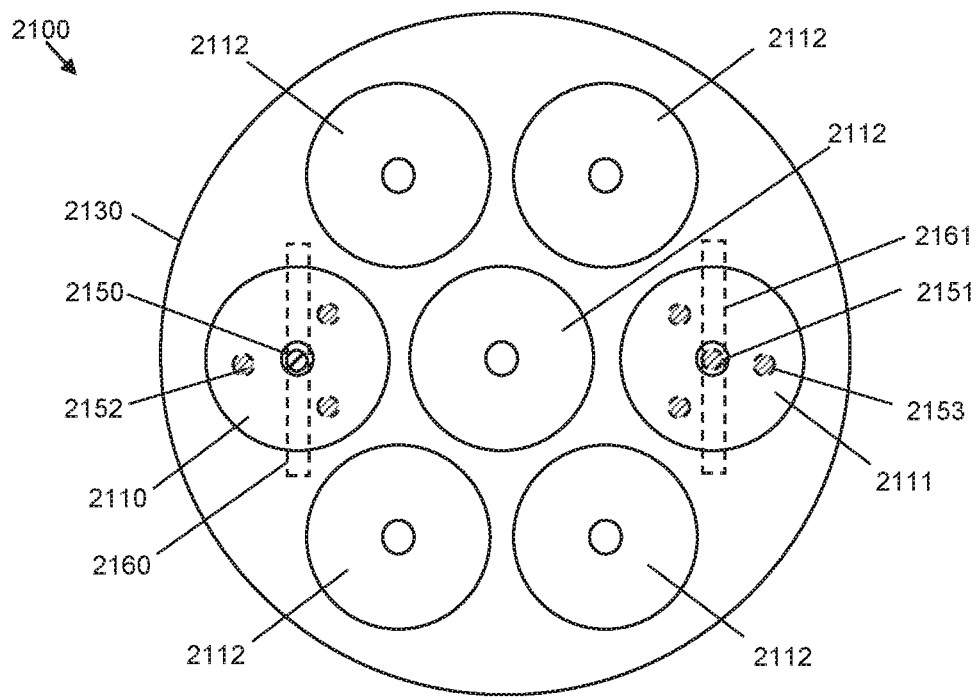
FIGS. 21-23 are top views of DRA arrays suitable for use in a microwave heating apparatus, in accordance with several other example embodiments.

Various embodiments of differently configured DRA arrays will now be described in conjunction with FIGS. 21-24. For example, FIG. 21 is a top view of a DRA array 2100 suitable for use in a microwave heating apparatus, in accordance with another example embodiment. DRA array 2100 includes seven horizontally-arranged dielectric resonators 2110-2112 coupled to a substrate 2130, including two exciter resonators 2110, 2111 and adjacent parasitic resonators 2112. In addition, although not shown, DRA array 2100 may include one or more additional resonators stacked on either or both of the exciter resonators 2110, 2111.

The substrate 2130 may be substantially similar to substrate 530 (FIG. 5), including the variations of substrate 530 discussed above. In the illustrated embodiment, multiple feeds 2150, 2151 configured to carry one or more RF signals are positioned within the central holes of the multiple exciter resonators 2110, 2111. So configured, each of the exciter resonators 2110, 2111 and its associated feed 2150 form a DRA. In alternate embodiments, one or more of the exciter resonators 2110, 2111 alternatively may be aperture coupled to a microstrip line 2160, 2161 or some other conductive structure, which instead may be used to carry an RF signal for exciting the exciter resonator 2110, 2111. In contrast with the embodiment of FIG. 5, exciter resonators 2110, 2111 also include additional feeds 2152, 2153 positioned at additional locations within each dielectric resonator 2110, 2111. When one or more additional resonators are stacked on either or both of the exciter resonators 2110, 2111, the central feed 2150, 2151 and/or the additional feeds 2152, 2153 may extend only into the lowest exciter resonator 2110, 2111, or the central feed 2150, 2151 and/or the additional feeds 2152, 2153 may extend up into and possibly through the additional resonators.

According to an embodiment, all of the feeds 2150-2153 and/or microstrip lines 2160, 2161 may receive the same RF signal. In various alternate embodiments, the feeds 2150-2153 and/or microstrip lines 2160, 2161 may receive different RF signals (e.g., RF signals at different frequencies and/or power levels), and/or provision of the RF signals to the feeds 2150-2153 and/or microstrip lines 2160, 2161 may be phased. For example, during a first time duration, the first exciter resonator (e.g., resonator 2110) may be provided with excitation from one or more of its associated feeds 2150, 2152 and/or microstrip line 2160, while the second exciter resonator 2111 may receive no excitation or different excitation from one or more of its associated feeds 2151, 2153 and/or microstrip line 2160. During a second time duration, the excitation provided to the first exciter resonator 2110 may be removed or altered, and the excitation provided to the second exciter resonator 2111 may either remain the same, or also be removed or altered. In this way, the cumulative e-fields produced by the DRA array 2100 may be varied over time in direction, intensity, frequency, or otherwise. Said another way, by providing multiple feeds 2150-2153 and/or microstrip lines 2160, 2161 and exciting them sequentially or in various combinations, a continuously or incrementally steerable beam or beams may be formed. More specifically, a beam of microwave energy may be steered in azimuth and/or elevation by activating the multiple feeds 2150-2153 and/or microstrip lines 2160, 2161 individually or in combination.

Figure 22:
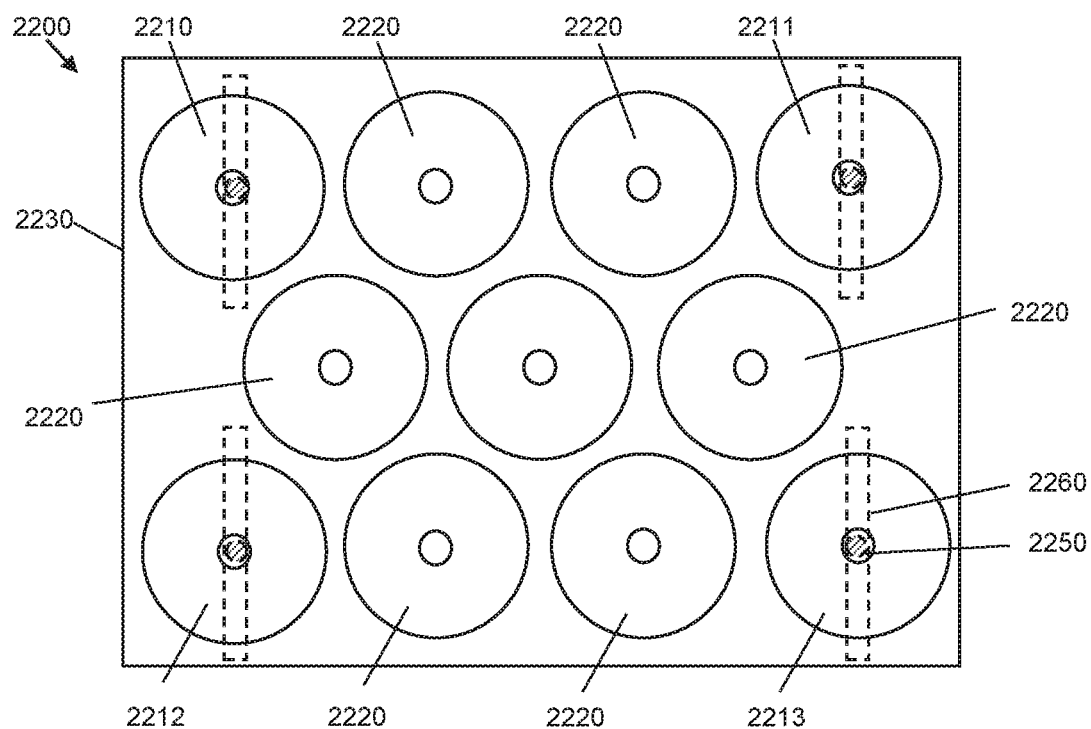

FIG. 22 is a top view of a DRA array 2200 suitable for use in a microwave heating apparatus, in accordance with yet another example embodiment. Although each of the previously-described DRA arrays have been indicated for use in a microwave heating system that includes a heating chamber (e.g., chamber 920, FIG. 9) with a circular cross-section, the DRA array 2200 of FIG. 22 may be particularly well suited for use in a microwave heating apparatus that includes a heating chamber with a rectangular cross-section. In other words, the DRA array 2200 may be well suited for use in a system that includes a heating chamber that essentially functions as a rectangular waveguide with a blocked end.

In the illustrated embodiment, DRA array 2200 includes eleven dielectric resonators 2210-2213, 2220 coupled to a rectangular substrate 2230, including a multiple exciter resonators 2210-2213 and adjacent parasitic resonators 2220. Except for the shape, the substrate 2230 may be substantially similar to substrate 530 (FIG. 5), including the variations of substrate 530 discussed above. In the illustrated embodiment, multiple feeds 2250 configured to carry one or more RF signals are positioned within the central holes of the multiple exciter resonators 2210-2213. So configured, each of the exciter resonators 2210-2213 and its associated feed 2250 form a DRA. Thus, the DRA array 2200 includes multiple DRAs. In alternate embodiments, one or more of the exciter resonators 2210-2213 alternatively may be aperture coupled to a microstrip line 2260 or some other conductive structure, which instead may be used to carry an RF signal for exciting the exciter resonator 2210-2213. In addition, although not shown, DRA array 2200 may include one or more additional resonators stacked on some or all of the exciter resonators 2210-2213, and the feeds 2250 may extend up into only the lowest exciter resonators 2210-2213 or up into and/or through the additional resonators.

As with DRA array 500, when an appropriate RF signal is carried by a feed 2250 or microstrip line 2260, the signal will cause the corresponding exciter resonator 2210-2213 to resonate at its resonant frequency. This, in turn, will cause the exciter resonator 2210-2213 to produce a primary e-field around the circumference of the exciter resonator 2210-2213 (e.g., e-field 440, FIG. 4). In addition, the exciter resonator 2210-2212 may produce a secondary e-field extending orthogonally upward from the top surface of the exciter resonator 2210-2213 (e.g., e-field 442, FIG. 4).

As with the embodiment of FIG. 21, and according to an embodiment, all of the feeds 2250 and/or microstrip lines 2260 may receive the same RF signal. In various alternate embodiments, the feeds 2250 and/or microstrip lines 2260 may receive different RF signals (e.g., RF signals at different frequencies and/or power levels), and/or provision of the RF signals to the feeds 2250 and/or microstrip lines 2260 may be phased.

Figure 23:
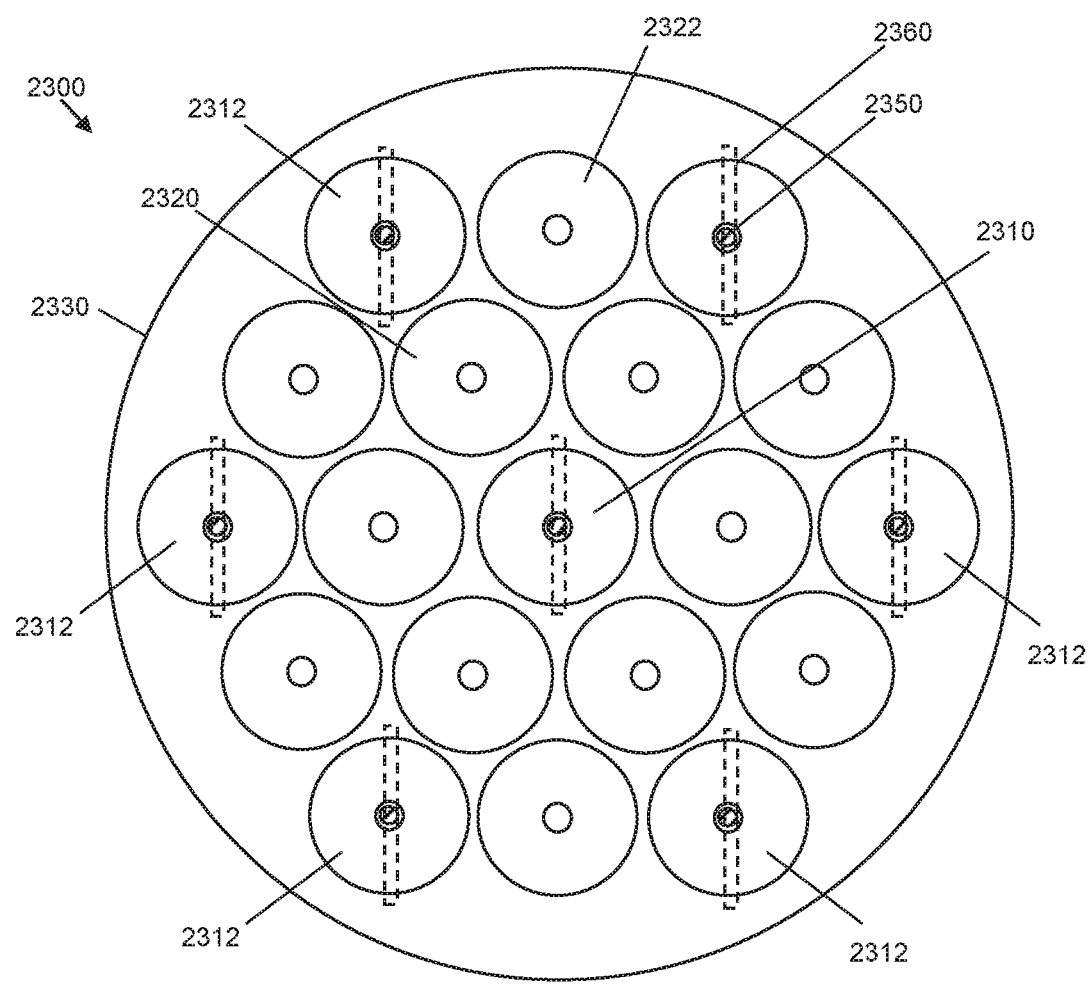

FIG. 23 is a top view of a DRA array 2300 suitable for use in a microwave heating apparatus, in accordance with yet another example embodiment. DRA array 2300 is similar to DRA array 500 in FIG. 5, except that DRA array 2300 includes an extra circumferentially placed row of dielectric resonators, rather than including only a single row of circumferentially placed dielectric resonators as in the DRA array 500 of FIG. 5. More specifically, DRA array 2300 includes nineteen dielectric resonators 2310, 2312, 2320, 2322 coupled to a substrate 2330, including a multiple exciter resonators 2310, 2312 and adjacent parasitic resonators 2320, 2322. More specifically, DRA array 2300 includes a centrally positioned exciter resonator 2310, a first circumferential row of parasitic resonators 2320 that are directly adjacent to the central exciter resonator 2310, and a second circumferential row of alternating exciter resonators 2312 and parasitic resonators 2322. In addition, although not shown, DRA array 2300 may include one or more additional resonators stacked on some or all of the exciter resonators 2310, 2312, and the feeds 2350 may extend up into only the lowest exciter resonators 2310, 2312 or up into and/or through the additional resonators.

As with the DRA array 500 of FIG. 5, multiple feeds 2350 configured to carry one or more RF signals are positioned within the central holes of the multiple exciter resonators 2310, 2312. So configured, each of the exciter resonators 2310, 2312 and its associated feed 2350 form a DRA. In alternate embodiments, one or more of the exciter resonators 2310, 2312 alternatively may be aperture coupled to a microstrip line 2360 or some other conductive structure, which instead may be used to carry an RF signal for exciting the exciter resonator 2310, 2312.

As with DRA array 500, when an appropriate RF signal is carried by a feed 2350 or microstrip line 2360, the signal will cause the corresponding exciter resonator 2310, 2312 to resonate at its resonant frequency. This, in turn, will cause the exciter resonator 2310, 2312 to produce a primary e-field around the circumference of the exciter resonator 2310, 2312 (e.g., e-field 440, FIG. 4). In addition, the exciter resonator 2310, 2312 may produce a secondary e-field extending orthogonally upward from the top surface of the exciter resonator 2310, 2312 (e.g., e-field 442, FIG. 4).

According to an embodiment, all of the feeds 2350 and/or microstrip lines 2360 may receive the same RF signal. In various alternate embodiments, the feeds 2350 and/or microstrip lines 2360 may receive different RF signals (e.g., RF signals at different frequencies and/or power levels), and/or provision of the RF signals to the feeds 2350 and/or microstrip lines 2360 may be phased.

Figure 24:
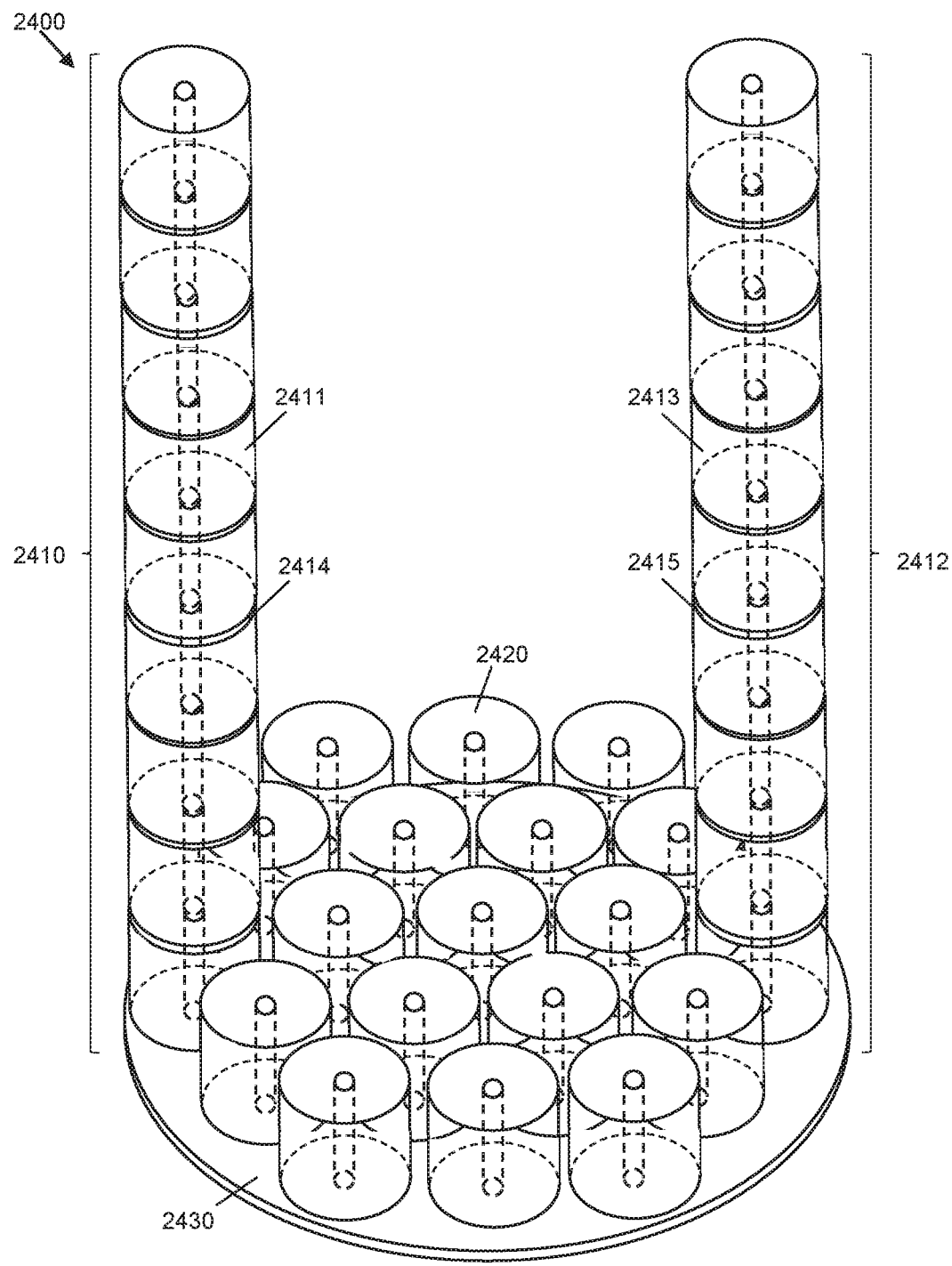
FIG. 24 is a perspective view of a DRA array suitable for use in a microwave heating apparatus, in accordance with yet another example embodiment.
Figure 25:
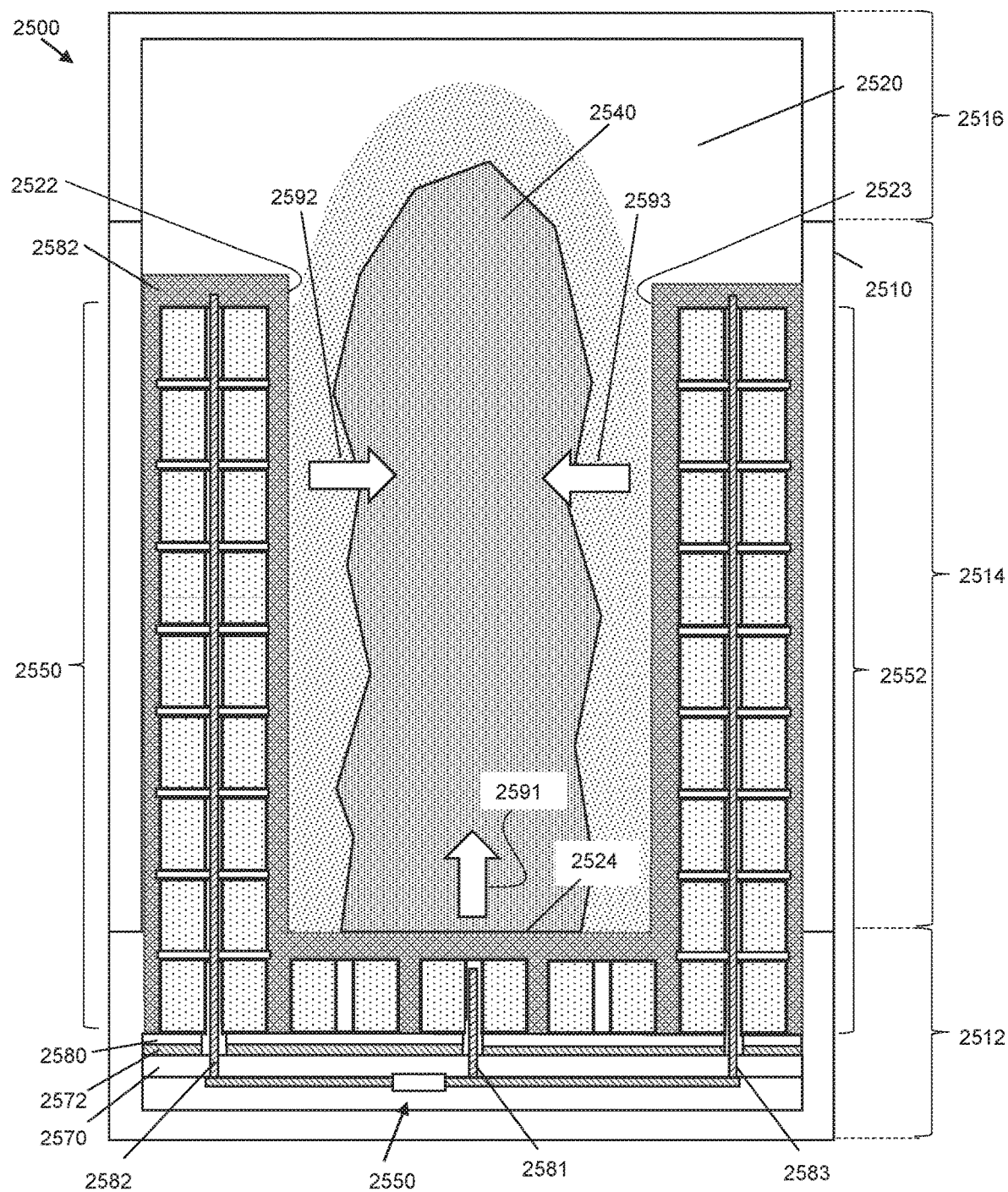
FIG. 25 is a cross-sectional, side view of a portable microwave heating apparatus, in accordance with another example embodiment.

Consistent with the DRA array embodiment illustrated in FIG. 23, FIG. 24 illustrates a perspective view of a compound DRA array 2400, and FIG. 25 illustrates a cross-sectional, side view of a microwave heating apparatus 2500 that may include a compound DRA array such as DRA array 2400. Compound DRA array 2400 is similar to DRA 600, FIG. 6, except that DRA array 2400 includes two vertically-stacked DRA arrays (including stacks 2410, 2412 of dielectric resonators 2411, 2413), as well as an additional horizontally-arranged DRA array (including adjacent dielectric resonators 2420), all coupled to substrate 2430. In addition, dielectric spacers 2414, 2415 may be positioned between adjacent resonators 2411, 2413 in the stacks 2410, 2412, as discussed previously. In alternate embodiments, some or all of the spacers 2414, 2415 may be excluded.

As described previously in conjunction with other embodiments, one or more feeds may extend into any one or more of the horizontally-arranged dielectric resonators 2420, including the lowest resonators in the dielectric resonator stacks 2410, 2412. In addition, the feeds associated with the dielectric resonator stacks 2410, 2412 may extend into only the lowest resonator, or may extend up into and/or through any number (including all) of the resonators 2411, 2413 in each stack 2410, 2412. Microstrip lines alternatively may be used to carry RF excitation signals, as discussed previously. When multiple feeds and/or microstrip lines are utilized to carry RF excitation signals, all of the feeds may receive the same RF signal, some feeds may receive different RF signals, and/or the various feeds may receive phased RF signals, in various embodiments.

Compound DRA array 2400 is shown to include nineteen horizontally-arranged dielectric resonators, and two resonator stacks 2410, 2412, each with nine vertically-stacked resonators 2411, 2413. However, those of skill in the art would understand, based on the description herein, that alternate embodiments may include more or fewer horizontally-arranged dielectric resonators, more or fewer dielectric resonator stacks, more or fewer dielectric resonators within each stack, dielectric resonators with different resonant frequencies (e.g., resonators of different sizes, dielectric constants, and so on), and/or different shaped or configured dielectric resonators, in other embodiments.

FIG. 25 illustrates a cross-sectional, side view of a microwave heating apparatus 2500 that may include a compound DRA array with multiple dielectric resonator stacks, such as compound DRA array 2400, according to another embodiment. Similar to the microwave heating apparatus 900 of FIG. 9, microwave heating apparatus 2400 includes a housing 2510, a heating chamber 2520, a system controller (e.g., system controller 310, not illustrated in FIG. 25), a user interface (e.g., user interface 330, not illustrated in FIG. 25), and a power supply system (e.g., power supply system 340, not illustrated in FIG. 25). In addition, the housing 2510 includes a base portion 2512, a chamber portion 2514, and a lid 2516 (which is in a closed state in FIG. 25), in an embodiment.

In contrast with the microwave heating apparatus 900 of FIG. 9, microwave heating apparatus 2500 includes two vertically-stacked DRA arrays 2550, 2552 that are positioned at different sides of chamber 2520, as well as a horizontally-arranged DRA array positioned at the bottom of the chamber 2520 (not numbered, but including the five dielectric resonators coupled to DRA substrate 2580). More specifically, the horizontally-arranged DRA array is positioned within a base portion 2512 of the housing 2510, a first vertically-stacked DRA array 2550 is positioned adjacent to a first sidewall of the chamber portion 2514 of the housing 2510, and a second vertically-stacked DRA array 2552 is positioned adjacent to a second sidewall of the chamber portion 2514. In the illustrated embodiment, each of the DRA arrays is covered with a conformal coating 2582 to define side surfaces 2522, 2523 and a bottom surface 2524 of the heating chamber 2520. In an alternate embodiment, a cover may be used to separate the DRA arrays from the chamber 2520. FIG. 25 also shows a load 2540 (e.g., a food load or other load) within the chamber 2520. Once again, the heating chamber 2520 is an enclosed air cavity, which essentially functions as a waveguide with a blocked end, as described previously.

According to an embodiment, the base portion 2512 of the housing 2510 contains the horizontally-arranged DRA array and an electronics substrate 2570 that houses one or more microwave power generation modules 2550 and a ground plane 2572. The microwave power generation module(s) 2550 are configured to provide one or more RF excitation signals to the horizontally-arranged DRA array and to the first and second vertically-stacked DRA arrays 2550, 2552. For example, the RF excitation signals(s) may be provided though feeds 2581, 2582, 2583, respectively. The first feed 2581 may cause the horizontally-arranged DRA array to produce a beam of electromagnetic energy in a direction that is orthogonal to the bottom surface 2524 of the chamber 2520, which direction generally is indicated by arrow 2591. Similarly, the second feed 2582 is configured to provide an RF excitation signal to the first vertically-stacked DRA array 2550, which causes the first vertically-stacked DRA array 2550 to produce a beam of electromagnetic energy in a direction that is orthogonal to the chamber sidewall 2522, which direction is generally indicated by arrow 2592. Finally, the third feed 2583 is configured to provide an RF excitation signal to the second vertically-stacked DRA array 2552, which causes the second vertically-stacked DRA array 2552 to produce a beam of electromagnetic energy in a direction that is orthogonal to the chamber sidewall 2523, which direction is generally indicated by arrow 2593. As discussed above, the feeds 2581-2583 may extend to any height within the dielectric resonators or the resonator stacks. In addition, although the various DRA arrays may be operated at substantially the same frequency, they alternatively may be operated at different frequencies or phases to provide more broadband energy coupling to the load 2540 within the chamber 2520.

Figure 26:
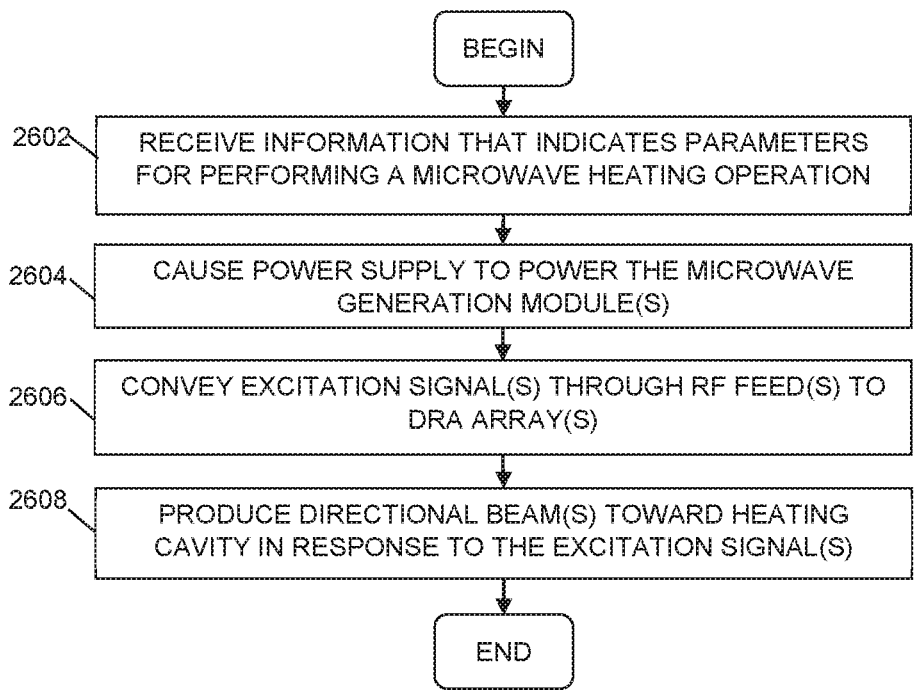
FIG. 26 is a flowchart of a method of operating a microwave system that includes a DRA array, in accordance with an example embodiment.

FIG. 26 is a flowchart of a method of operating a microwave system (e.g., system 100, 300, 900, 2500) that includes one or more simple or compound DRA arrays, in accordance with an example embodiment. The method begins, in block 2602, when the system controller (e.g., system controller 310, FIG. 3) receives information that indicates parameters for performing a microwave heating operation. For example, the information may be derived from user inputs provided through a user interface (e.g., user interface 330, FIG. 3), and the information may convey the duration of a heating operation, the power level of a heating operation, and/or other parameters relating to the heating operation.

In block 2604, the system controller causes a power supply (e.g., power supply 340, FIG. 1) to provide power to one or more microwave generation modules (e.g., module 350, FIG. 3) in a way that will cause the microwave generation module(s) to produce one or more excitation signals that are consistent with the parameters specified for the heating operation.

According to an embodiment, in block 2606, each excitation signal may be conveyed through an RF feed (e.g., feed 968, FIG. 9) or through a microstrip line (e.g., microstrip line 1276, FIG. 12) to a DRA array (e.g., DRA array 500, 960, 1010, 1110, 1210, 1310, 1410, 2100, 2200, 2300, 2400, 2550, 2552). Each DRA array, in response, produces a directional electromagnetic energy beam, in block 2608, which is oriented toward a heating chamber (e.g., heating chamber 920) of the microwave system. As discussed previously, the chamber may contain a near-field load (e.g., load 940, 2540). The DRA array continues to produce the directional electromagnetic energy beam until provision of the excitation signal is discontinued, at which point the method ends.

Figure 27:
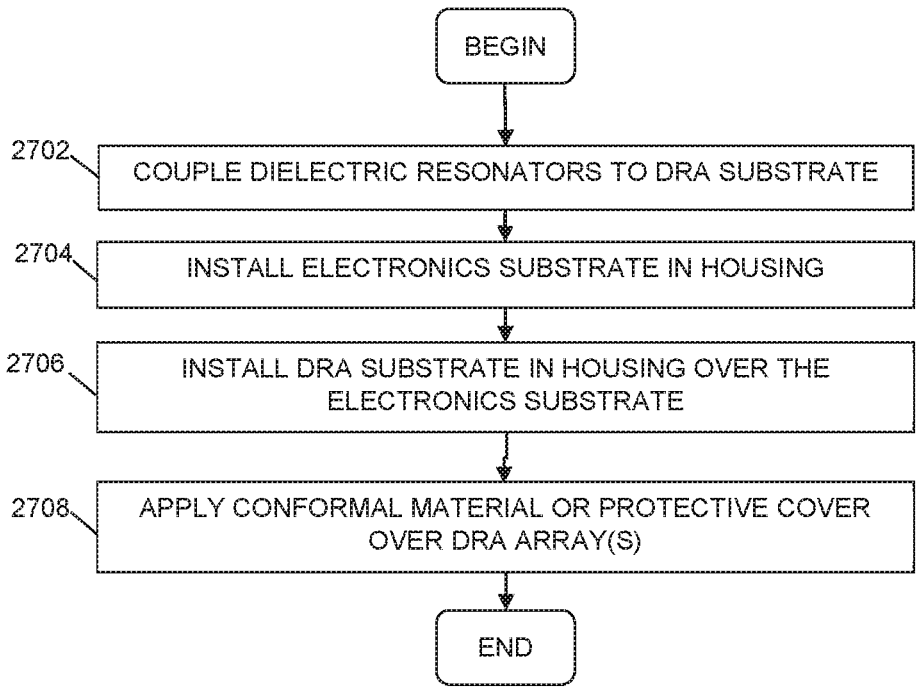
FIG. 27 is a flowchart of a method of manufacturing a microwave system that includes a DRA array, in accordance with an example embodiment.

FIG. 27 is a flowchart of a method of manufacturing a microwave system (e.g., system 100, 300, 900, 2500) that includes a simple or compound DRA array, in accordance with an example embodiment. The method begins, in block 2702, by coupling a plurality of dielectric resonators together in a dielectric resonator stack, where the dielectric resonator stack includes a lowest, first dielectric resonator and one or more second dielectric resonators stacked over the first dielectric resonator. In some embodiments, one or more dielectric spacers also may be coupled between adjacent dielectric resonators in the stack to define a distance between the adjacent dielectric resonators, where the distance ensures that the adjacent dielectric resonators are closely capacitively coupled. In an embodiment, the plurality of dielectric resonators (or the dielectric resonator stack) also is coupled to a DRA substrate (e.g., DRA substrate 980, 2580) to form a DRA substrate assembly. In addition, one or more additional dielectric resonator stacks and/or one or more individual dielectric resonators may be coupled to the DRA substrate. In this manner, one or more vertically-stacked DRA arrays may be formed, as well as one or more horizontally-arranged DRA arrays.

In block 2704, one or more electronics substrates (e.g., substrate 970, 2570) are installed into a housing (e.g., into a base portion or other portion of a housing). The housing includes a heating chamber (e.g., chamber 920, 2520), which is configured to contain a load (e.g., load 940, 2540) that is to be heated or defrosted. According to an embodiment, each electronic substrate houses a microwave generation module (e.g., module 950, 2550), including one or more RF feed structures (e.g., feed 968, 969, 2581-2583 or microstrip lines). In addition, each electronic substrate includes a ground plane (e.g., ground plane 972, 2572).

In block 2706, the dielectric resonator stack(s) and/or the DRA substrate assembly is installed in the housing over the electronics substrate so that the DRA substrate is positioned between the ground plane and the heating chamber. According to an embodiment, installing the dielectric resonator stack and/or the DRA substrate into the housing is performed so that the RF feed structure(s) are in sufficient proximity to the lowest dielectric resonator in each stack to be capable of exciting at least the lowest dielectric resonator into resonance when the RF feed structure is supplied with a suitable RF excitation signal. For example, after installing a dielectric resonator stack into the housing, an RF feed structure may extend into the lowest dielectric resonator but not into the one or more overlying second dielectric resonators. Alternatively, an RF feed structure may extend into the lowest dielectric resonator and up into one or more of the second dielectric resonators. In block 2708, the DRA array is protected (i.e., a physical separation is established between the DRA array and the chamber) by applying a conformal material (e.g., conformal coating 982, 2582) over the DRA array(s), or by placing a protective cover over the DRA array(s).

For the sake of brevity, conventional techniques related to resonators, amplifiers, biasing, load modulation, impedance matching, power splitters and/or power combiners, microwave applications, and other functional aspects of the systems (and the individual operating components of the systems) may not be described in detail herein. The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically. Thus, although the schematic shown in the figures depict one exemplary arrangement of elements, additional intervening elements, devices, features, or components may be present in an embodiment of the depicted subject matter.

An embodiment of a microwave heating apparatus includes a solid state microwave energy source, a first dielectric resonator antenna that includes a first exciter dielectric resonator and a first feed structure in proximity to the first exciter dielectric resonator, one or more additional dielectric resonators stacked above the top surface of the first exciter dielectric resonator to form a vertically-stacked dielectric resonator antenna array. The first feed structure is electrically coupled to the microwave energy source to receive a first excitation signal, and the first exciter dielectric resonator is configured to produce a first electric field in response to the excitation signal provided to the first feed structure. A second dielectric resonator of the additional dielectric resonators that is directly adjacent to the first exciter dielectric resonator is closely capacitively coupled with the first exciter dielectric resonator when the excitation signal is provided.

Another embodiment of a microwave heating apparatus includes a chamber, a solid state microwave energy source, a first dielectric resonator antenna that includes a first exciter dielectric resonator and a first feed structure in proximity to the first exciter dielectric resonator, and one or more second dielectric resonators stacked above the top surface of the first exciter dielectric resonator to form a dielectric resonator antenna array. The chamber is configured to contain a load. The first feed structure is electrically coupled to the microwave energy source to receive a first excitation signal from the microwave energy source, and the first exciter dielectric resonator is configured to produce a first electric field in response to the excitation signal provided to the first feed structure.

An embodiment of a method of operating a microwave system that includes a microwave generation module includes producing, by the microwave generation module, a first excitation signal that is conveyed to a first RF feed structure, where the first RF feed structure is positioned in proximity to a first dielectric resonator, and one or more second dielectric resonators are stacked over the first dielectric resonator. The method further includes producing a first electric field, by the first dielectric resonator in response to the first excitation signal conveyed by the first RF feed structure, and producing a second electric field, by the one or more second dielectric resonators in response to impingement of the first electric field, in response to the first excitation signal, or in response to both the first electric field and the first excitation signal. The second electric field is directed toward a chamber that contains a near-field load.

An embodiment of a method of manufacturing a microwave system includes coupling a plurality of dielectric resonators together in a dielectric resonator stack, where the dielectric resonator stack includes a lowest, first dielectric resonator and one or more second dielectric resonators stacked over the first dielectric resonator. The method also includes installing a substrate into a housing, where an RF feed structure is coupled to the substrate, and the housing defines a chamber that is configured as a waveguide with a blocked end. The method also includes installing the dielectric resonator stack into the housing so that the RF feed structure is in sufficient proximity to the first dielectric resonator to be capable of exciting the first dielectric resonator into resonance when the RF feed structure is supplied with a suitable RF excitation signal.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A microwave heating apparatus comprising:
a solid state microwave energy source;
a chamber configured as a waveguide with a blocked end, wherein the chamber is further configured to contain a load;
a first dielectric resonator antenna within the chamber that includes a first exciter dielectric resonator with a central hole and a first conductive feed extending into the central hole of the first exciter dielectric resonator, wherein the first exciter dielectric resonator has a top surface and an opposed bottom surface with the central hole extending in between, wherein the first conductive feed is electrically coupled to the microwave energy source to receive a first excitation signal from the microwave energy source, and wherein the first exciter dielectric resonator is configured to resonate and produce a first electric field in response to the excitation signal provided to the first conductive feed and in response to how far the first conductive feed extends into the central hole; and
one or more additional dielectric resonators, each with the top surface, the opposed bottom surface, and the central hole, stacked above the top surface of the first exciter dielectric resonator, each with the top surface of a lower dielectric resonator facing the bottom surface of a higher dielectric resonator and with the central hole of the higher dielectric resonator aligned linearly with the central hole of the lower dielectric resonator, to form a vertically-stacked dielectric resonator antenna array within the chamber.

2. The microwave heating apparatus of claim 1, wherein a second dielectric resonator of the additional dielectric resonators that is directly adjacent to the first exciter dielectric resonator is closely capacitively coupled with the first exciter dielectric resonator when the excitation signal is provided.

3. The microwave heating apparatus of claim 2, wherein, when the excitation signal is provided, the first electric field produced by the first exciter dielectric resonator directly impinges on the second dielectric resonator, causing the second dielectric resonator to produce a second electric field in response to impingement of the first electric field.

4. The microwave heating apparatus of claim 3, wherein the second dielectric resonator is a parasitic dielectric resonator that does not receive an excitation signal directly from the first conductive feed, but instead produces the second electric field in response to the impingement of the first electric field.

5. The microwave heating apparatus of claim 1, wherein the first conductive feed extends through the first exciter dielectric resonator and into at least one of the one or more additional dielectric resonators.

6. The microwave heating apparatus of claim 5, wherein the conductive feed extends into or through all of the one or more additional dielectric resonators.

7. The microwave heating apparatus of claim 1, wherein the first dielectric resonator antenna includes one or more additional feeds in the first exciter dielectric resonator, wherein the one or more additional feeds are electrically coupled to the microwave energy source to receive one or more additional excitation signals from the microwave energy source.

8. The microwave heating apparatus of claim 1, wherein the dielectric resonator antenna array further comprises one or more additional dielectric resonator antennas, wherein each of the one or more additional dielectric resonator antennas includes an additional conductive feed, an additional exciter dielectric resonator and one or more extra additional dielectric resonators stacked above a top surface of the additional exciter dielectric resonator.

9. The microwave heating apparatus of claim 1, wherein each of the first exciter dielectric resonator and the one or more additional dielectric resonators have a shape selected from a cylinder, a disk, a cone, a parallelepiped, a sphere, and a dome.

10. The microwave heating apparatus of claim 1, further comprising:
one or more dielectric spacers positioned between each set of adjacent dielectric resonators in the dielectric resonator antenna array.

11. The microwave heating apparatus of claim 10, wherein each of the one or more dielectric spacers has a thickness that defines a distance between each set of the adjacent dielectric resonators, wherein each distance is less than one fifth of a wavelength of a resonant frequency of the first exciter dielectric resonator.

12. The microwave heating apparatus of claim 11, wherein each distance is between zero millimeters and 12.5 millimeters.

13. The microwave heating apparatus of claim 11, wherein each distance is less than one tenth of the wavelength of the resonant frequency of the first exciter dielectric resonator.

14. The microwave heating apparatus of claim 11, wherein each distance is between zero millimeters and 3.0 millimeters.

15. The microwave heating apparatus of claim 1, further comprising:
a ground plane positioned at a first side of the dielectric resonator antenna array, and
wherein the chamber is positioned at an opposite side of the dielectric resonator antenna array from the ground plane.

16. The microwave heating apparatus of claim 1, wherein the chamber is configured so that, in the absence of the vertically-stacked dielectric resonator antenna array, the chamber does not support propagation of electromagnetic waves in the chamber in any propagation mode when excited by electromagnetic energy in a microwave heating band, and wherein the vertically-stacked dielectric resonator antenna array loads the chamber in a manner that enables the electromagnetic waves to propagate in the chamber in one or more propagation modes when excited by the electromagnetic energy in the microwave heating band.

17. The microwave heating apparatus of claim 1, further comprising a conformal material covering the first exciter dielectric resonator and the one or more additional dielectric resonators.

18. The microwave heating apparatus of claim 1, wherein the first exciter dielectric resonator and the one or more additional dielectric resonators have a same geometrical shape and are of substantially a same size.

19. The microwave heating apparatus of claim 1, wherein the first exciter dielectric resonator and at least one of the one or more additional dielectric resonators have different geometrical shapes.

20. The microwave heating apparatus of claim 1, wherein the first exciter dielectric resonator and at least one of the one or more additional dielectric resonators have substantially different sizes.

21. The microwave heating apparatus of claim 1, wherein the solid state microwave energy source comprises:
an amplifier arrangement that includes a transistor with a transistor input and a transistor output, wherein the amplifier arrangement is configured to produce the excitation signal at a microwave frequency in a range of 2.3 gigahertz (GHz) to 2.6 GHz.

22. The microwave heating apparatus of claim 21, wherein the amplifier arrangement forms a portion of an oscillator sub-system that further comprises:
resonant circuitry along a feedback path between the transistor output and the transistor input, wherein a resonant frequency of the resonant circuitry is the microwave frequency.

23. A microwave heating apparatus comprising:
a chamber configured to contain a load;
a solid state microwave energy source;
a first dielectric resonator antenna within the chamber that includes a first exciter dielectric resonator with a central hole and a first conductive feed extending into the central hole of the first exciter dielectric resonator, wherein the first exciter dielectric resonator has a top surface and an opposed bottom surface with the central hole extending inbetween, wherein the first conductive feed is electrically coupled to the microwave energy source to receive a first excitation signal from the microwave energy source, and wherein the first exciter dielectric resonator is configured to resonate and produce a first electric field in response to the excitation signal provided to the first conductive feed and in response to how far the first conductive feed extends into the central hole; and one or more second dielectric resonators, each with the top surface, the opposed bottom surface, and the central hole, stacked above the top surface of the first exciter dielectric resonator, each with the top surface of a lower dielectric resonator facing the bottom surface of a higher dielectric resonator and with the central hole of the higher dielectric resonator aligned linearly with the central hole of the lower dielectric resonator, to form a dielectric resonator antenna array.

24. The microwave heating apparatus of claim 23, wherein the chamber is configured so that, in the absence of the dielectric resonator antenna array, the chamber does not support propagation of electromagnetic waves in the chamber in any propagation mode when excited by electromagnetic energy in a microwave heating band, and wherein the dielectric resonator antenna array loads the chamber in a manner that enables the electromagnetic waves to propagate in the chamber in one or more propagation modes when excited by the electromagnetic energy in the microwave heating band.

25. The microwave heating apparatus of claim 23, wherein a cross-sectional shape of the chamber is selected from a circle, an ellipse, and a rectangle.

26. The microwave heating apparatus of claim 23, further comprising:
one or more dielectric spacers positioned between each set of adjacent dielectric resonators in the dielectric resonator antenna array.

27. The microwave heating apparatus of claim 26, wherein each of the one or more dielectric spacers has a thickness that defines a distance between each set of the adjacent dielectric resonators, and wherein each distance is less than one fifth of a wavelength of a resonant frequency of the first exciter dielectric resonator.

28. The microwave heating apparatus of claim 27, wherein each distance is less than one tenth of the wavelength of the resonant frequency of the first exciter dielectric resonator.

29. A method of manufacturing a microwave system, the method comprising:
coupling a plurality of dielectric resonators together in a dielectric resonator stack, wherein the dielectric resonator stack includes a lowest, first dielectric resonator with a central hole and one or more second dielectric resonators each with the central hole stacked over the first dielectric resonator, each with the top surface of a lower dielectric resonator facing the bottom surface of a higher dielectric resonator and with the central hole of the higher dielectric resonator aligned linearly with the central hole of the lower dielectric resonator;

installing a substrate into a housing, wherein the housing defines a chamber that is configured as a waveguide with a blocked end; and installing the dielectric resonator stack into the housing so that a conductive feed extends into the central hole of the first dielectric resonator, and the conductive feed excites the first dielectric resonator into resonance in response to how far the conductive feed extends into the central hole when the conductive feed and in response to how far the first conductive feed extends into the central hole is supplied with a suitable radio frequency (RF) excitation signal.

30. The method of claim 29, wherein:

after installing the dielectric resonator stack into the housing, the conductive feed extends into the first dielectric resonator but not into the one or more second dielectric resonators.

31. The method of claim 29, wherein:

after installing the dielectric resonator stack into the housing, the conductive feed extends into the first dielectric resonator and into at least one of the one or more second dielectric resonators.

32. The method of claim 29, further comprising:

coupling one or more dielectric spacers between adjacent dielectric resonators in the dielectric resonator stack to define a distance between the adjacent dielectric resonators, wherein the distance ensures that the adjacent dielectric resonators are closely capacitively coupled.

33. The method of claim 29, further comprising:

establishing a physical separation between the dielectric resonator stack and the chamber using a structure selected from a conformal material and a cover.

* * * * *